United States Patent
Hisatake et al.

(10) Patent No.: US 6,693,688 B1
(45) Date of Patent: Feb. 17, 2004

(54) FLAT DISPLAY DEVICE

(75) Inventors: Yuzo Hisatake, Yokohama (JP);
Takashi Nakamura, Kumagaya (JP);
Atsuko Oono, Fukaya (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/499,696

(22) Filed: Feb. 8, 2000

(30) Foreign Application Priority Data

Feb. 8, 1999 (JP) ............................................. 11-029493
Mar. 12, 1999 (JP) ............................................. 11-066088
Jan. 26, 2000 (JP) ........................................ 2000-016482

(51) Int. Cl.[7] ............................................. G02F 1/1335
(52) U.S. Cl. ........................... 349/113; 349/96; 349/106
(58) Field of Search ........................... 349/96, 106, 117, 349/118, 113

(56) References Cited

U.S. PATENT DOCUMENTS 6,025,899 A * 2/2000 Fukunaga et al. .......... 349/115
6,160,595 A * 12/2000 Kishimoto .................... 349/61
6,163,348 A * 12/2000 Izumi et al. ................... 349/25
6,300,929 B1 * 10/2001 Hisatake et al. .............. 349/94

* cited by examiner

Primary Examiner—Dung Nguyen

(57) ABSTRACT

A phase difference plate for delaying the phase of incident light by $\lambda/4$ and a liquid crystal layer for shifting the incident light by $\lambda/2$ in accordance with an applied voltage are interposed between a polarization plate and a selective reflecting layer made of a cholesteric liquid crystal. A color filter layer is formed on the polarization-plate-side of the selective reflecting layer. A back-surface light source for emitting light having intensity peaks in a plurality of predetermined wavelengths is located on the back-surface of the selective reflecting layer. The selective reflecting layer is formed to transmit almost all light components in the plurality of small regions including the plurality of predetermined wavelengths and reflect almost all light components in regions between the plurality of small regions.

11 Claims, 12 Drawing Sheets

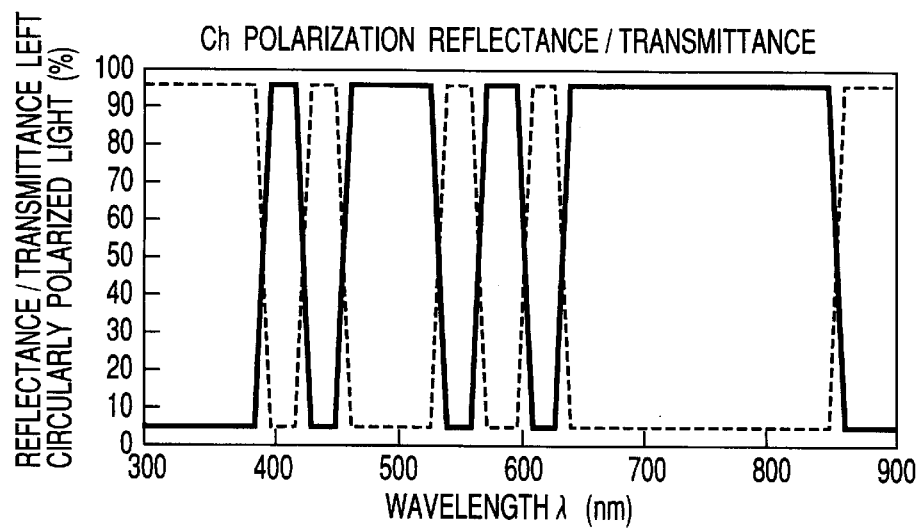
F I G. 8
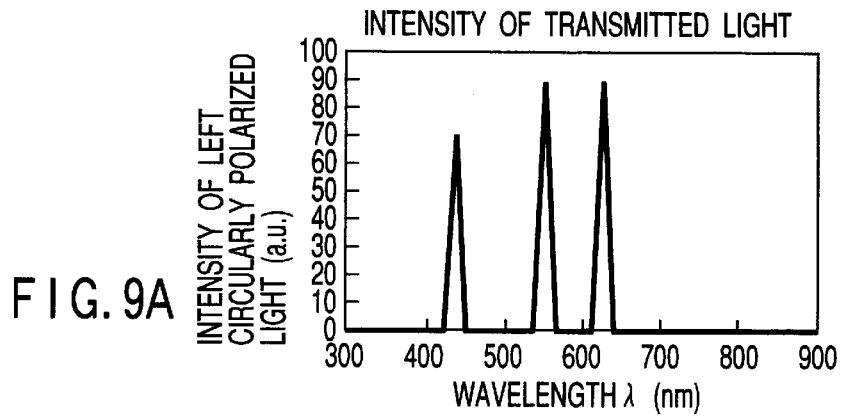
F I G. 9A
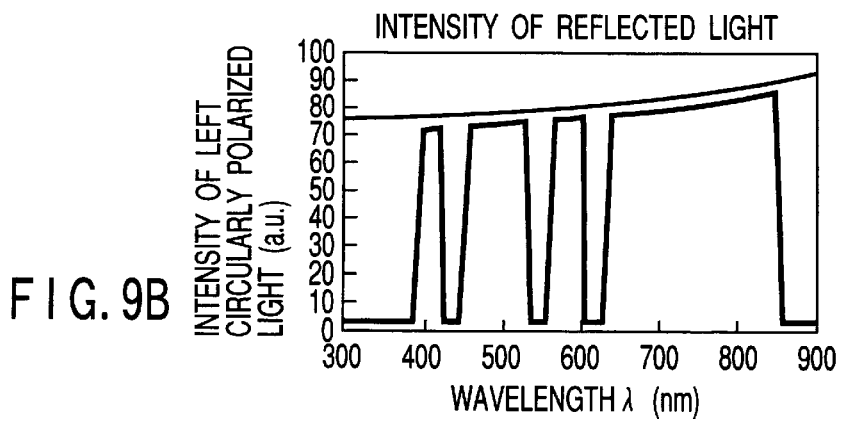
F I G. 9B

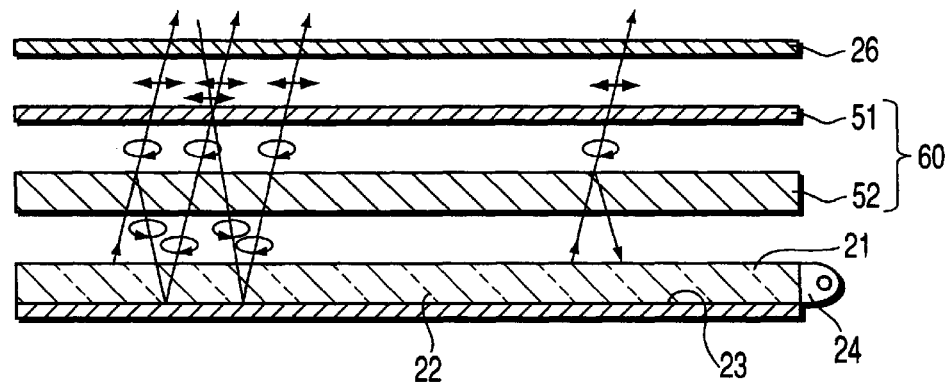
F I G. 15
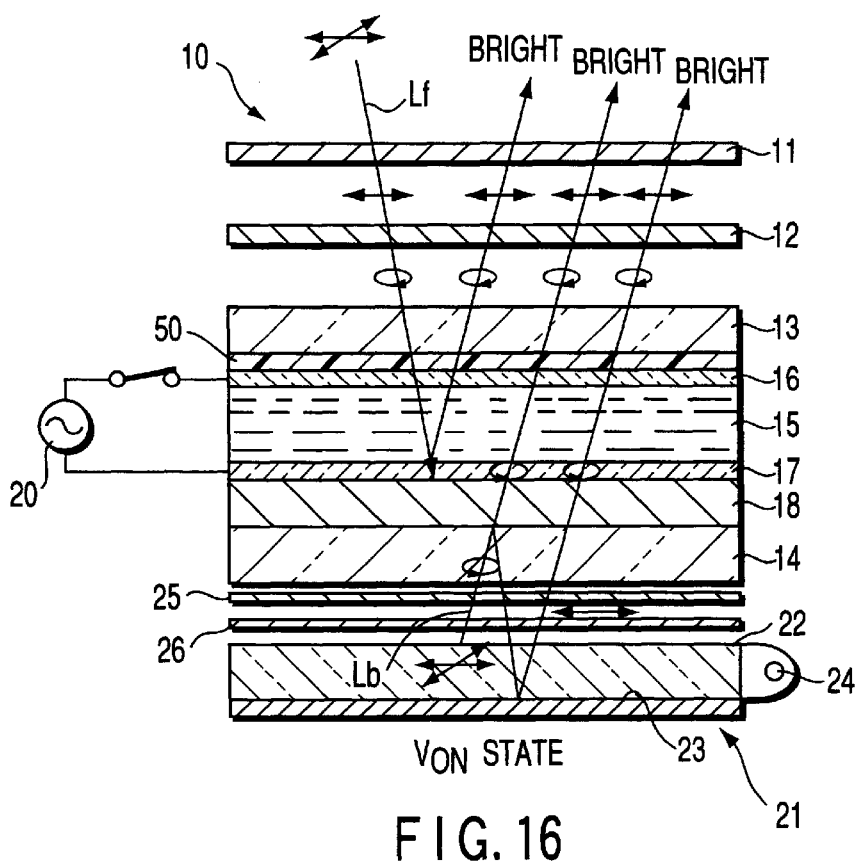
F I G. 16

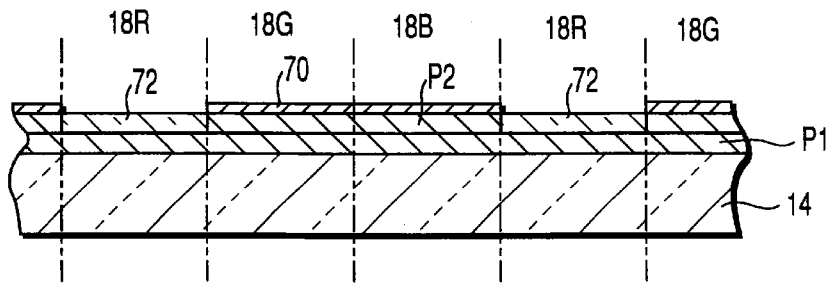
F I G. 21A
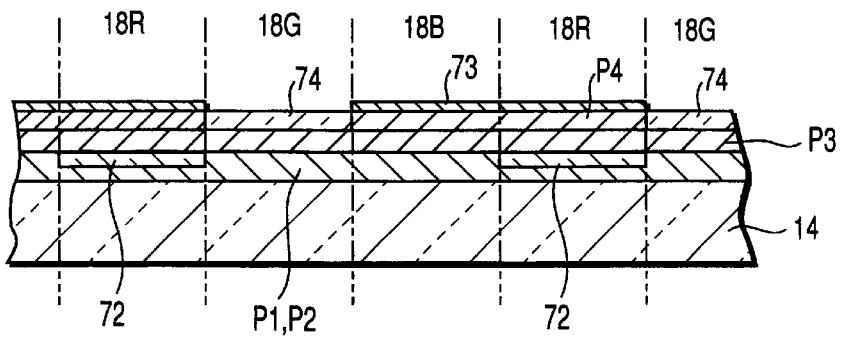
F I G. 21B
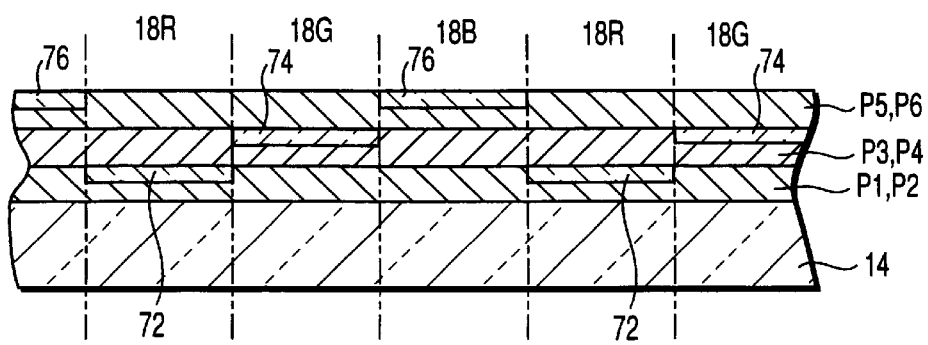
F I G. 21C

B1: Ch LAYER HAVING POLARIZATION REFLECTANCE FOR BLUE WAVELENGTH
B2: Ch LAYER HAVING POLARIZATION REFLECTANCE FOR GREEN WAVELENGTH
C1: Ch LAYER HAVING POLARIZATION REFLECTANCE FOR GREEN WAVELENGTH
C2: Ch LAYER HAVING POLARIZATION REFLECTANCE FOR RED WAVELENGTH

FLAT DISPLAY DEVICE

CROSS-REFERENCE TO RELATED APPLICATIONS

This application is based upon and claims the benefit of priority from the prior Japanese Patent Applications No. 11-029493, filed Feb. 8, 1999, No. 11-066088, filed Mar. 12, 1999; and No. 2000-016482, filed Jan. 26, 2000, the entire contents of which are incorporated herein by reference.

BACKGROUND OF THE INVENTION

The present invention relates to a flat display device such as a liquid crystal display device.

For example, a reflection type liquid display device as a conventional flat display device displays an image using external light, so illumination light is short and results in a dark display screen depending on use environments. In particular, this display device cannot be used in a dark place.

There has been developed a semitransmission type liquid crystal display device using a semitransparent reflecting plate (half mirror) for reflecting external light and a backlight arranged on the back surface side of the semitransparent reflecting plate, so as to use the display device as a transmission liquid crystal display device in a dark environment. The utilization efficiency of incident light of the semitransparent reflecting plate is 50% at maximum. The brightness of the display screen is much lower than that of the transmission or reflection type liquid crystal display device.

To overcome this drawback, there has been examined a semitransmission type liquid crystal display device in which a pinhole corresponding to each pixel is formed in a reflecting plate, and a microlens corresponding to each pinhole is disposed. In this liquid crystal display device, when external light is used, the external light reflected by an area except the pinholes of the reflecting plate is used as a light source. When a backlight is used, light transmitted through the pinholes is focused by the microlenses, and the focused light is used to improve the light utilization efficiency.

Even in such a liquid crystal display device, however, light loss caused by the pinholes occurs in using the external light. The transmission type liquid crystal display device using a backlight is frequently used to increase power consumption.

The reflecting plate having pinholes has a complicated structure and must be attached as an independent member to the liquid crystal panel. This produces disparity and greatly degrades the display performance.

There has also been examined a so-called front light type display device in which a light guide plate is disposed on the observation surface side of a reflection type liquid crystal display device, and a linear light source is disposed on the side surface of the light guide plate. However, light is frequently reflected on the front light surface, and display quality such as contrast of the liquid crystal display device greatly degrades.

In the above semitransmission type liquid crystal display device can perform color display by forming a color filter layer. More specifically, the conventional semitransparent type color liquid crystal display device is constructed by stacking a polarization plate, front-surface substrate, color filter layer, drive electrodes, liquid crystal layer, back-surface substrate, semireflecting plate, and back-surface light source in this order. The color filter layer is formed on the front side of the semireflecting plate, i.e., on the observer side.

When the liquid crystal display device functions as a reflection type, external light entering from the front-surface substrate side passes through the color filter layer and liquid crystal layer, is reflected by the reflecting plate, and passes through the liquid crystal layer and color filter layer again, and emerges outside. That is, the external light passes the color filter layer twice along the forward and return optical paths. On the other hand, when the liquid crystal display device functions as a reflection type, light emitted by the back-surface light source passes through the color filter layer only once.

When the display device as the transmission type uses a color filter layer to obtain a sufficient saturation, external light is greatly absorbed by the color filter layer in the display device functioning as the reflection type because the external light passes through the color filter twice. As a result, reflection brightness lowers. Assume that the density of the color filter layer is reduced to obtain sufficient brightness as the reflection type. That is, assume that the wavelength dispersion characteristic of the transmittance of the color filter layer is designed to obtain a desired saturation upon transmission of external light through the color filter layer twice. For example, assume that the Y value of the average transmittance is set to 40% or more. In this case, light emitted by the back-surface light source in the liquid crystal display device functioning as the transmission type passes through the color filter only once, and the saturation becomes short.

As described above, in the conventional semitransmission type color liquid crystal display device, when it functions as the reflection type, the display brightness greatly degrades; when it functions as the transmission type, the display type color density greatly lowers. The conventional semitransmission type color liquid crystal display obtains either optical characteristics.

BRIEF SUMMARY OF THE INVENTION

The present invention has been made in consideration of the above situation, and has as its object to provide a semitransmission type flat display device which can solve the conventional problems and greatly improve light utilization efficiency.

It is another object of the present invention to provide a flat display device capable of displaying an image with sufficient brightness at a sufficient color density even if the display device functions as the transmission or reflection type.

In order to achieve the above object, according to the present invention, there is provided a flat display device comprising a first polarization plate having a polarization axis and adapted to transmit linearly polarized light along the polarization axis, an optical modulation layer located behind the first polarization plate to modulate incident light in accordance with an applied voltage, a selective reflecting layer located behind the optical modulation layer to selectively reflect a first circularly polarized light component of the incident light, and a backlight located behind the selective reflecting layer to output light having intensity peaks in a plurality of predetermined wavelengths, wherein the selective reflecting layer substantially transmits, of the first circularly polarized light component, light components having wavelengths in a plurality of small regions including the respective predetermined wavelengths, and substantially reflects a light component in regions between the plurality of small regions.

According to the flat display device having the above arrangement, about 95% of the first circularly polarized light components output from a back-surface light source passes through the selective reflecting layer. The selective reflecting layer reflects about 90% of the first circularly polarized light component of the external light. Regardless of whether the flat display device operates as either a reflection type device or the transmission type device, an image can be displayed at a high color purity and high brightness.

Another liquid crystal display device according to the present invention comprises: an optical modulation layer which is sandwiched between a pair of observation-side and back-surface-side transparent substrates opposing each other and has a plurality of liquid crystal pixels arranged in a matrix, the optical modulation layer being adapted to modulate incident light in accordance with an applied voltage; a selective reflecting layer having a plurality of selective reflecting filters arrayed in a predetermined cycle, respectively, on back-surface sides of the liquid crystal pixels to selectively and partially reflect light components having different wavelength bands; and a color filter layer having a plurality of color filters disposed to oppose front-surface sides of the selective reflecting filters and arranged such that a peak wavelength of spectral characteristics in a visible light range of each of the color filters falls within a reflection wavelength band of a corresponding one of the selective reflecting filters.

According to the liquid crystal display device, the plurality of selective reflecting filters for selectively and partially reflecting light components having different wavelength bands in the selective reflecting layer are arrayed in a predetermined cycle so as to correspond to the liquid crystal pixels. Each of the selective reflecting filters reflects a light component of the corresponding selective reflection wavelength band at a predetermined ratio and transmits the rest. Of the external light incident from the observation side, light in a specific wavelength region is reflected in accordance with the reflectance in the selective reflection wavelength band. Of the light of the external light source, which is incident from the observation side, light in a specific wavelength region is transmitted in accordance with the transmittance in the selective reflection wavelength band. Therefore, both external light and light from the light source can be used as source light beams, and semitransmission display is allowed.

The color filter layer is made up of the plurality of color filters having different spectral characteristics. Each color filter is combined with a selective reflection filter having corresponding selective reflection characteristics. More specifically, the peak wavelength of the spectral characteristics in the visible light range of each color filter is designed to fall within the selective reflection wavelength band of the corresponding selective reflecting filter. In accordance with the spectral characteristics, each color filter transmits or absorbs light reflected or transmitted by the corresponding selective reflection filter and output to the observation side. The color filter layer is formed on the observation side closer than the selective reflecting layer and preferably formed on the inner surface of the observation-side transparent substrate.

As described above, each liquid crystal pixel is combined with the selective reflecting filter and color filter having a specific relationship to construct a color pixel of R (red), G (green), or B (blue). In general, since pixels of each color form a stripe, the corresponding reflecting filter and color filter are formed in stripes.

In the flat liquid crystal display device of the present invention, the selective wavelength bands of selective reflecting filters correspond to color pixels, respectively. Such a selective reflecting filter can be formed of a cholesteric liquid crystal layer. The cholesteric liquid crystal layer selectively reflects a light component in a specific wavelength band corresponding to the helical direction and pitch of liquid crystal molecules, and transmits the remaining light components, as is well known. The cholesteric liquid crystal layer can also be used as a polarization element.

In this case, the cholesteric liquid crystal layer is adjusted so that the selective reflection characteristics cover the entire visible light range. However, in the liquid crystal display device of the present invention, the helical pitch of the cholesteric liquid crystal is set to cover the wavelength band in units of three color pixels, i.e., R, G, and B color pixels. An arbitrary selective reflecting filter is formed to have an average helical pitch different from that of any adjacent selective reflecting filter.

This selective reflecting layer is formed as follows. The entire inner surface of the back-surface-side transparent substrate is coated with a cholesteric liquid crystal, and each selective reflecting filter area is irradiated with an ultraviolet ray while adjusting the irradiation time. Selective reflecting filters having different crosslinking pitches are arrayed in a predetermined cycle to construct one selective reflecting layer. When the selective reflecting layer is formed on the inner surface of the transparent substrate as described above, disparity can be eliminated to improve the display quality of the liquid crystal display device.

Still another liquid crystal display device according to the present invention comprises:

an optical modulation layer which is sandwiched between a pair of observation-side and back-surface-side transparent substrates opposing each other and has a plurality of liquid crystal pixels arranged in a matrix, the optical modulation layer being adapted to modulate incident light in accordance with an applied voltage; a selective reflecting layer having a plurality of selective reflecting filters arrayed in a predetermined cycle, respectively, on back-surface sides of the liquid crystal pixels to selectively and partially reflect light components having different wavelength bands; and a color filter layer having a plurality of color filters disposed to oppose front-surface sides of the selective reflecting filters and having different transmission wavelength ranges in a visible light range, wherein each color filter has a wavelength range in which a transmittance in the visible light range is not less than 50% and a wavelength range in which a transmittance in the visible light range is less than 50%, and each of the selective reflecting filters has a reflectance of 50% to 90% for light in the wavelength range in which a transmittance of a corresponding one of the color filters opposing each selective reflecting filter is not less than 50%, and has a reflectance of more than 90% for light in the wavelength range in which a transmittance of the corresponding color filter is less than 50%.

According to the flat display device having the above arrangement, each of the selective reflecting filters has a reflectance of 50% to 90% for light in the wavelength range in which a transmittance of a corresponding one of the color filters opposing each selective reflecting filter is 50% or more. When this display device functions as the reflection type, sufficient reflection brightness can be obtained. On the other hand, even when the display device functions as the transmission type by arranging a back-surface light source having a reflecting plate, a light amount obtained by subtracting the reflectance of each selective reflecting filter from 100% and a light amount reflected by the selective reflecting filter by an amount corresponding to the reflectance and reused via the reflecting plate of the surface light source contribute to the display brightness. That is, the sum of these two light amounts allows the polarization transmittance of the selective reflecting filter to fall within the range of 50% to 90% in the wavelength band. Therefore, display having sufficient reflection brightness can be achieved.

On the other hand, each selective reflecting filter opposing a color filter whose transmittance in the visible light range is less than 50% has a large reflectance of more than 90% for the light in the wavelength range in the visible light range of the color filter. When the flat display device functions as the reflection type, external light passes through the color filter twice to display an image at a sufficiently high saturation. When the flat display device functions as the transmission type, the selective reflecting filter sufficiently reflects light in the above wavelength range toward the back-surface light source side. The light does not pass through the opposing pixel, and therefore a sufficiently high saturation can be obtained in the display.

When the color filter layer is formed on the inner surface of the observation-side transparent substrate, no disparity is produced in colors, and a sufficiently high saturation can be obtained. When the selective reflecting layer is formed on the inner surface of the back-surface-side transparent substrate, disparity due to erroneous perception of the selective reflecting layer as a display shadow can be eliminated.

In the flat display device of the present invention, the selective reflection wavelength band of each selective reflecting filter is determined to match the color pixel opposing the selective reflecting filter. Such selective reflecting filters are made of cholesteric liquid crystal thin films, and the helical pitches of the cholesteric liquid crystal layers are set to have wavelength bands and polarization reflectances corresponding to the pixels of the respective colors, R (red), G (green), and B (blue). An arbitrary selective reflecting filter is formed to have the helical pitch, number of layers, and film thickness different from any adjacent selective reflecting filter.

The selective reflecting layer can be formed as a single layer having selective reflecting filters having different crosslinking pitches by applying a cholesteric liquid crystal to the inner surface of the back-surface-side transparent substrate and irradiating the selective reflecting filter regions with ultraviolet rays upon adjusting their irradiation times. The selective reflecting layer having different polarization reflectances depending on the wavelength ranges can be obtained as a multilayered structure having different helical pitches of the cholesteric liquid crystal thin films in their direction of thickness. The multilayered structure can be obtained as a multilayered structure in which the adjacent selective reflecting filters have different helical pitches depending on the spectral characteristics of the corresponding color filters, or a multilayered structure having various film thicknesses.

When a selective reflecting filter is designed such that the first wavelength range, i.e., the wavelength range in which the transmittance of the opposing color filer is 50% or more partially overlaps the first wavelength range of any adjacent selective reflecting filter, the dimensional tolerance can have a margin in forming the pattern of the selective reflecting layer.

When the square value of the Y value (Y in tristimulus values) of the average transmittance of the color filter layer is set to 40% or more, a flat display panel capable of displaying an image with sufficiently high brightness at a sufficiently high saturation can be obtained as in the conventional reflection type flat display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 10 show a liquid crystal display device according to the first embodiment of the present invention, in which FIG. 1 is a sectional view of the liquid crystal display device;

FIG. 2 is an enlarged sectional view of an array substrate of the liquid crystal display device;

FIG. 3 is a schematic plan view of the array substrate;

FIG. 5 is a view illustrating the principle of operation of a selective reflecting layer in the liquid crystal display device;

FIG. 6 is a graph showing the profile of external light;

FIG. 7 is a graph showing the profile of exit light from a back-surface light source of the liquid crystal display device;

FIG. 8 is a graph showing the reflectance and transmittance of the liquid crystal display device;

FIG. 9A is a graph showing the transmittance intensity of left circularly polarized light in the liquid crystal display device;

FIG. 9B is a graph showing the reflectance intensity of left circularly polarized light in the liquid crystal display device;

FIG. 10 is a graph showing the relationship between the slit width and brightness of the selective reflecting layer in the liquid crystal display device;

FIGS. 11A to 14 show a liquid crystal display device according to the second embodiment of the present invention, in which FIG. 11A is a sectional view illustrating a state in which a first voltage is applied to the liquid crystal layer of the liquid crystal display device;

FIG. 12 is a sectional view showing the arrangement relationship between the color filters of a color filter layer and the selective reflecting filters of a selective reflecting layer in the liquid crystal display device;

FIG. 13 is a graph showing the reflectance of a G selective reflecting filter;

FIG. 14 is a graph showing the reflectance characteristics of the selective reflecting layer and the spectral characteristics of the color filter layer;

FIG. 15 is a sectional view schematically showing the main part of a liquid crystal display device according to the third embodiment of the present invention;

FIGS. 16 to 22 show a liquid crystal display device according to the fourth embodiment of the present invention, in which FIG. 16 is a sectional view illustrating a state in which a first voltage is applied to the liquid crystal layer of the above liquid crystal display device;

FIG. 17 is a sectional view showing the relationship between the color filters of a color filter layer and the selective reflecting filters of a selective reflecting layer in the above liquid crystal display device;

FIG. 18 is a graph showing the spectral characteristics of the above color filter layer;

FIG. 19 is a graph showing the square value of the transmittance of the above selective reflecting layer;

FIG. 20 is a graph showing the spectral characteristics of the above selective reflecting layer;

FIGS. 21A to 21C are sectional views showing the steps in forming the above selective reflecting layer;

FIG. 22 is a graph showing the total reflectance of the above selective reflecting layer and color filter layer.

DETAILED DESCRIPTION OF THE INVENTION

Figure 1:
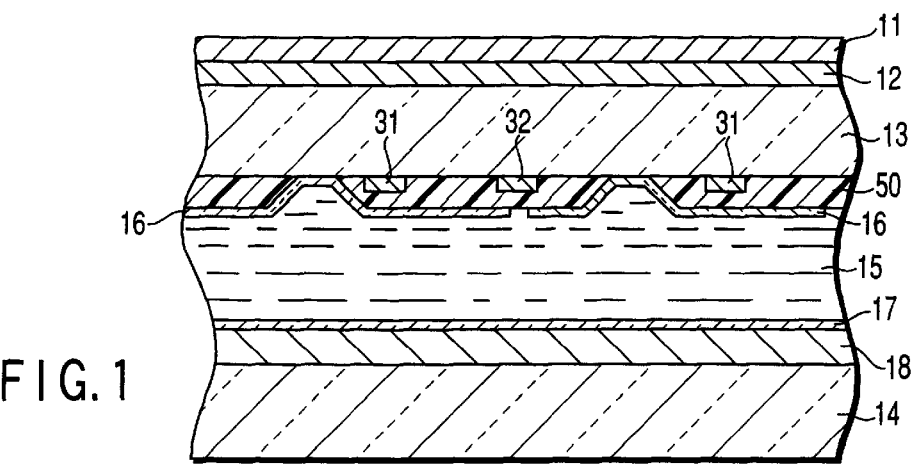
Figure 2:
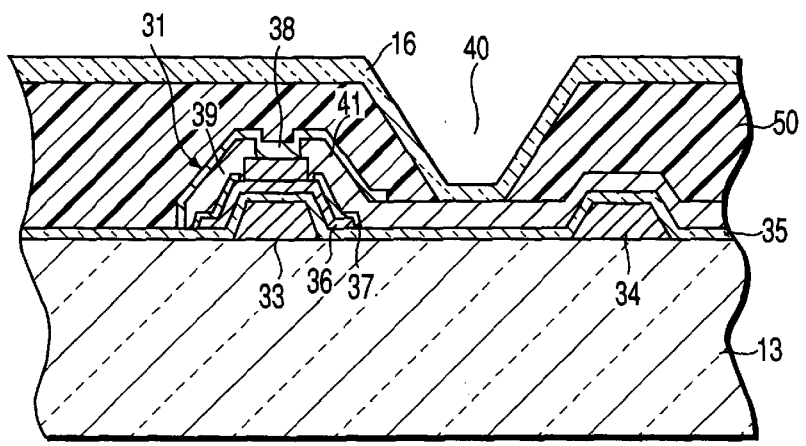
Figure 3:
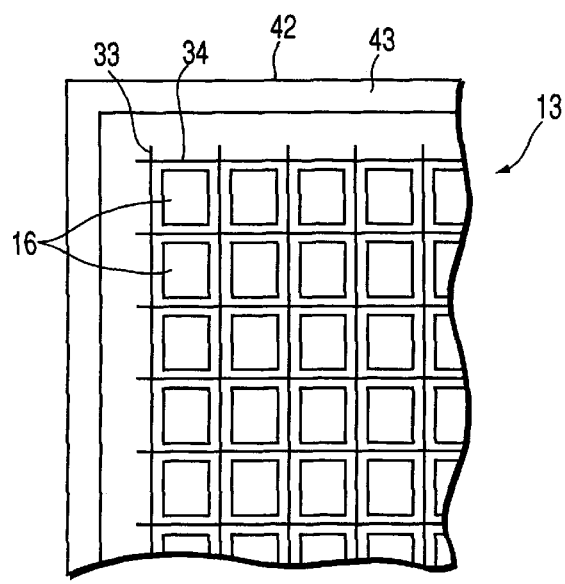

Semitransmission liquid crystal display devices according to preferred embodiments of the present invention will now be described with reference to the accompanying drawing.

The basic structure of a liquid crystal display device 10 of this embodiment will be described below. As shown in FIGS. 1 to 4A, the liquid crystal display device 10 has a polarization plate 11, λ/4 plate 12, color filter layer 50, vertical alignment liquid crystal layer 15, cholesteric liquid crystal layer 18, and back-surface light source 21, all of which are arranged in this order from the observation side. The liquid crystal layer 15 serves as an optical phase modulation layer, and the liquid crystal layer 18 serves as a selective reflecting layer upon polymerizing the cholesteric liquid crystal.

The liquid crystal display device 10 has a display element formed by sandwiching the liquid crystal layer 15 between two opposing glass substrates 13 and 14. The λ/4 plate 12 and polarization plate 11 are stacked in this order on the observation side of the display element, i.e., the outer surface of the glass substrate 13. A λ/4 plate 25, a polarization plate 26, and the back-surface light source 21 are formed in this order to oppose the outer surface of the other glass substrate 14. The plate 12 serves as a fixed retarder layer, while the liquid crystal layer 15 serves as a variable retarder layer. The fixed and variable retarder layers construct a variable retarder.

The glass substrate 13 on the observation side of the liquid crystal element constructs an array substrate. A color filter layer 50 is formed on the inner surface of the glass substrate 13. A large number of pixel electrodes 16 made of transparent ITO form a matrix on the color filter layer 50. Signal lines 32 and scanning lines 34 including gate electrodes 33 form a matrix on the glass substrate 13. Auxiliary capacitance electrodes (not shown) are formed, as needed. Thin film transistors (to be referred to as TFTs hereinafter) 31 serving as switching elements are formed at the intersections between the signal lines 32 and scanning lines 34. The TFTs are connected to the pixel electrodes 16, respectively.

An oxide film 35 is formed on the signal lines 32 and scanning lines 34. Each TFT is comprised of a semiconductor layer 36 made of amorphous silicon (a—Si) formed on the corresponding gate electrode 33 through the oxide film 35, and source and drain electrodes 41 and 39 formed on the semiconductor layer through a low-resistance semiconductor film 37. Each TFT is then covered with a passivation film 38.

In a TFT having a bottom gate structure in which a gate electrode 33 is located below a semiconductor film 36, external light incident from the array substrate 13 to the TFT 31 is shielded by the gate electrode 33 and does not enter the semiconductor film 36. As a result, a decrease in contrast ratio caused by an optical leakage current generated by light in outdoor use of the display device can be prevented.

Each pixel electrode 16 is connected to the source electrode 41 via a 10-μm square contact hole 40 formed in the color filter layer 50. The color filter layer 50 is formed on the entire surface of the pixels. The color filter layer 50 is made up of color filter layers of three primary colors, i.e., red, green, and blue, or complementary primary colors, i.e., yellow, magenta, and cyan. The pixel electrodes 30 and counter electrode 17 arranged in a matrix control the electric field of the liquid crystal layer 15 in units of pixels, thereby displaying a color image with additive primaries.

Any one of the signal line 32, scanning line 34, and auxiliary capacitance line is located at the boundary portion of the pixel electrode 16. In use of transmitted light from the back-surface light source 21, light from the back-surface light source does not leak, and therefore a decrease in contrast ratio does not occur.

The glass substrate 14 on the back-surface side of the liquid crystal element constructs a counter substrate. The counter electrode 17 made of a transparent conductive film formed of ITO or the like is formed on almost the entire surface of the glass substrate 14 which opposes the pixel electrodes 16. A polymerized film of a cholesteric liquid crystal is sandwiched between the glass substrate 14 and counter electrode 17 to form the selective reflecting layer 18 serving as a semitransparent reflecting layer. Note that the counter electrode 17 is preferably formed simultaneously in film formation and patterning by normal mask sputtering. In this case, when the counter electrode 17 is formed, the process load on the cholesteric liquid crystal layer 18 can be greatly reduced.

Aligning films (not shown) are formed on those surfaces of the array substrate 13 and counter electrode 14, which contact the liquid crystal layer 15. These aligning films have aligning direction so that the liquid crystal molecules of the liquid crystal layer 15 align themselves perpendicularly to the substrate surface. Therefore, a large number of liquid crystal pixels arrayed in a matrix are formed between the array substrate 13 and counter substrate 14.

The array substrate 13 and counter substrate 14 are adhered to each other through a seal material 43 applied to the edges (seal portions) 42 of the substrates. In this case, the seal material 43 is preferably applied to an area of the counter substrate 14 where the selective reflecting layer 18 is not formed. When the seal material is applied to the selective reflecting layer 18, adhesion of the seal material is poor, and reliability degradation such as peeling of the substrates may occur in long-term use of 10,000 hrs or more.

Alternatively, the selective reflecting layer 18 may be coated with an overcoat agent excellent in adhesion of the seal material, and the seal material is applied to the selective reflecting layer 18 through this overcoat agent, thereby preventing reliability degradation. An example of the overcoat agent can be acrylic resin used in a normal color filter.

The back-surface light source 21 formed on the back surface side of the glass substrate 14 is comprised of a light guide member 22 made of a transparent flat plate made of acrylic resin or the like, a linear light source 24 disposed on the side surface of the light guide member, and a scattering reflecting layer 23 formed on the lower surface of the light guide member.

The detailed structure of the liquid crystal display device 10 and its principle of operation will be described below.

Figure 5:
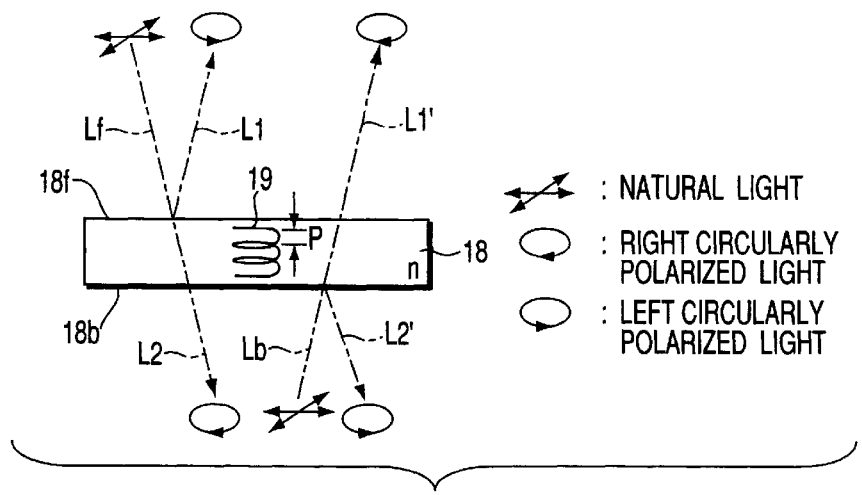

As shown in FIG. 5, the selective reflecting layer 18 made of a cholesteric liquid crystal has a function of reflecting only a counterclockwise or right circularly polarized light component of incident light reaching its one major surface 18f, and transmitting the clockwise or left circularly polarized light component having a sense or rotational direction reverse to that of the reflected component of this incident light, or a function of reflecting only the counterclockwise or right circularly polarized light component of incident light reaching the other major surface 18b and transmitting the clockwise or left circularly polarized light component having a rotational direction reverse to that of the reflected component of this incident light. When this state is viewed from the major surface 18f side, the rotational direction of the reflected light output to the one-major surface side is the same as that of the light transmitted from the back-surface side, and the rotational direction of reflected light output to the back-surface side is equal to that of transmitted light output to the back-surface side. The rotational directions of circularly polarized light components L1, L2, L1', and L2' in FIG. 5 are observed from the major-surface 18f side of the selective reflecting layer 18.

Assume that the cholesteric liquid crystal constructing the selective reflecting layer 18 has a value np (the product of a helical pitch p and an average refractive index n of the liquid crystal molecules) equal to a wavelength λ of the incident light. When the liquid crystal molecules 19 have a left-handed helical structure when viewed from the observation side, the left circularly polarized light component of external light Lf incident from the major-surface 18f side is selectively reflected by the major surface 18f, and the rest is transmitted through the other major surface 18b.

When the value np is equal to the wavelength λ of the incident light, the cholesteric liquid crystal ideally has a function of reflecting 100% of the circularly polarized light component having the same rotational direction (counterclockwise or clockwise) as that of the helix (counterclockwise or clockwise). In practice, the cholesteric liquid crystal transmits about 10% of this light component.

The selective reflecting layer 18 selectively reflects the left circularly polarized light component of light Lb incident from the other major surface 18b in the same manner as described above.

Figure 4A:
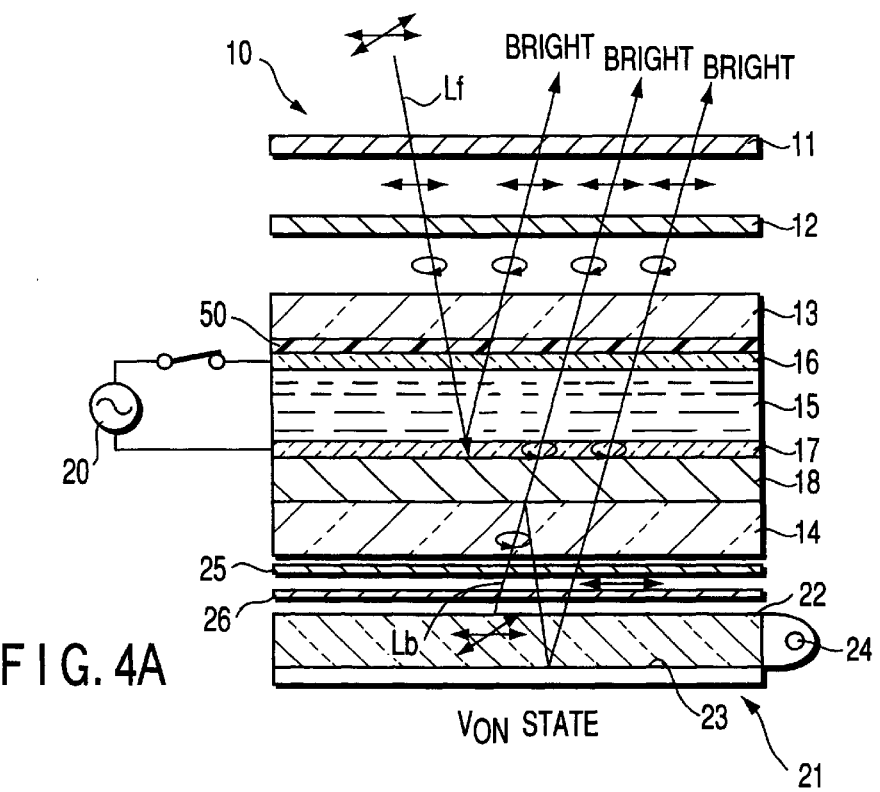
FIG. 4A is a sectional view illustrating a state in which a first voltage is applied to the liquid crystal layer of the liquid crystal display device.

In the liquid crystal display device 10 having the above selective reflecting layer 18, in the ON state wherein a voltage is applied from a light source 20 to the vertical aligning liquid crystal layer 15, i.e., accurately, in the state (Von state) wherein a voltage equal to or higher than the threshold value of the liquid crystal is applied, as shown in FIG. 4A, the nematic liquid crystal molecules align themselves in a direction parallel to the substrate from the array substrate 13 to the counter substrate 14, i.e., assume a homogeneous alignment.

In this state, light Lf incident downward from the observation side passes through the polarization plate 11 and the λ/4 plate 12 serving as the fixed retarder layer and enters as a right circularly polarized light component the liquid crystal layer 15 serving as the variable retarder layer. The light Lf is then delayed λ/2 in phase by the liquid crystal layer 15 and is therefore converted into a left circularly polarized light component, which reaches the selective reflecting layer 18. As described above, therefore, the incoming left circularly polarized light component is reflected by the selective reflecting layer 18, and its phase is delayed λ/2 by the liquid crystal layer 15 again. The resultant light component becomes a right circularly polarized light component, which is then output to the observation side. This light component passes through the λ/4 plate 12 again and is converted into a linearly polarized light component along the polarization axis of the polarization plate 11. The linearly polarized light component is then output outside through the polarization plate 11, thereby setting the display in the bright state.

Figure 4B:
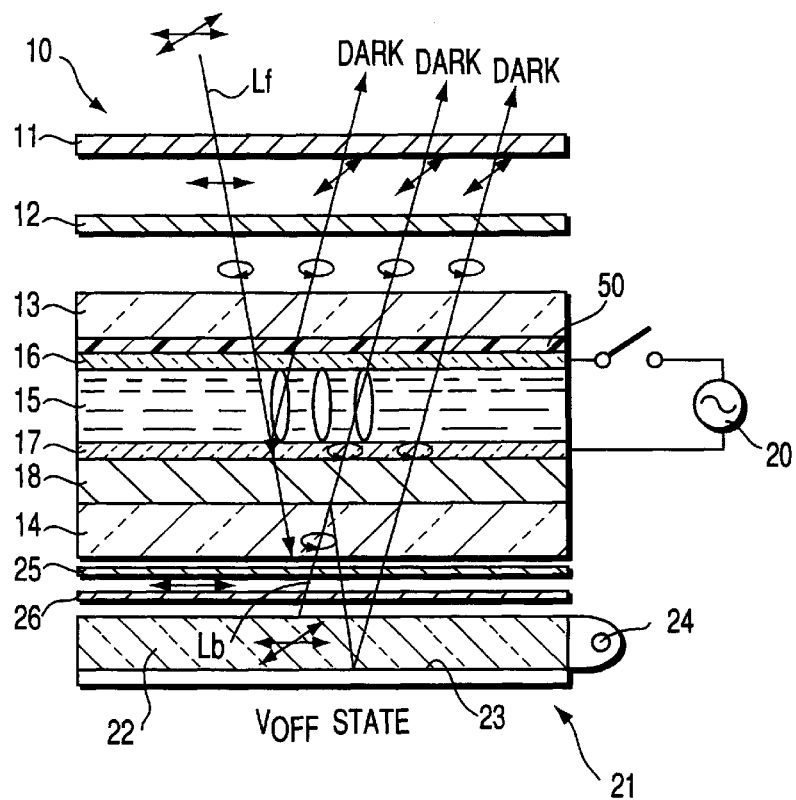
FIG. 4B is a sectional view illustrating a state in which a second voltage is applied to the liquid crystal layer of the liquid crystal display device.

As shown in FIG. 4B, in the OFF state (including the zero voltage) (Voff state) wherein a voltage less than the threshold value is applied to the liquid crystal layer 15, the liquid crystal molecules in the liquid crystal layer 15 align themselves perpendicular to the surfaces of the glass substrates 13 and 14 and do not modulate the phase of the incident light.

In this state, the light Lf incident downward from the observation side passes through the polarization plate 11 and λ/4 plate 12 and enters as the right circularly polarized light component the liquid crystal layer 15 in the same manner as in the Von state. The light Lf is not phase-modulated by this liquid crystal layer, and reaches the selective reflecting layer 18 as a right circularly polarized light component. For this reason, the right circularly polarized light component is transmitted through the selective reflecting layer 18 toward the back-surface side. This component is converted by the plate 25 into a linearly polarized light component having a vibration component along the absorption axis of the polarization plate 26. As a result, the incident light Lf does not return to the observation surface to set the display in the dark state.

Operation upon actuating the back-surface light source 21 arranged on the back-surface side of the selective reflecting layer 18 will be described below. In the Von state in FIG. 4A, light Lb output from the surface light source 21 is converted into a left circularly polarized light component by the polarization plate 26 and λ/4 plate 25. A predetermined portion (about 10%) of the left circularly polarized light component passes through the selective reflecting layer 18, and the rest is reflected by the selective reflecting layer. The light component having passed through the selective reflecting layer 18 is phase-modulated by the liquid crystal layer 15 and converted into a right circularly polarized light component. This light component passes through the λ/4 plate 12 to obtain a linearly polarized light component along the polarization axis of the polarization plate 11. This light component passes through the polarization plate 11 and output to the observation-surface side, thereby setting the display in the bright state.

In the Voff state shown in FIG. 4B, the left circularly polarized light component passing through the selective reflecting layer 18 is not phase-modulated by the liquid crystal layer 15 and is directly output to the observation side. This light component passes through the λ/4 plate 12 and is converted into a linearly polarized light component having a vibration direction perpendicular to the polarization axis of the polarization plate 11. The polarization plate 11 absorbs this light component, thereby setting the display in the dark state.

In the liquid crystal display device that operates as described above, according to this embodiment, the value np as the product of the helical pitch p and average refractive index n of the cholesteric polymer of the cholesteric liquid crystal layer constructing the selective reflecting layer 18 is set to cover substantially the entire visible range such that the helical pitch p changes along the direction of thickness of the cholesteric liquid crystal layer and the left circularly polarized light component is selectively reflected. However, the selective reflecting layer 18 has a helical structure for transmitting a left circularly polarized light component for light in the wavelength range near the three major wavelengths of spectra of the output light from the back-surface light source 21. The three major wavelengths of light components output from the back-surface light source 21 are about 430 nm, about 550 nm, and about 610 nm. The selective reflecting layer 18 transmits light components having three small wavelength ranges each having a width of 20 to 30 nm (this width will be referred to as a slit width hereinafter) centered on each of the three major wavelengths.

To form a cholesteric liquid crystal layer whose helical pitch changes along the direction of thickness of the layer, the following methods are preferable: a method of stacking a plurality of types of cholesteric liquid crystal polymer layers having different pitches; and a method of, in applying a cholesteric liquid crystal material to a substrate and hardening it, coating the cholesteric liquid crystal coating film with an additive for increasing the helical pitch of the cholesteric liquid crystal, e.g., a nematic liquid crystal having an infinite helical pitch.

Figure 6:
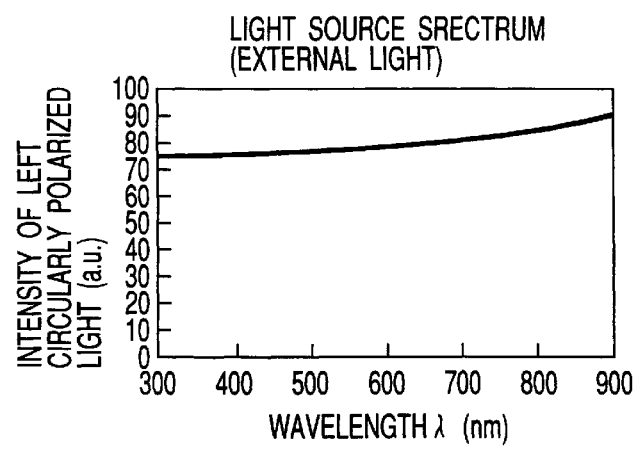
Figure 7:
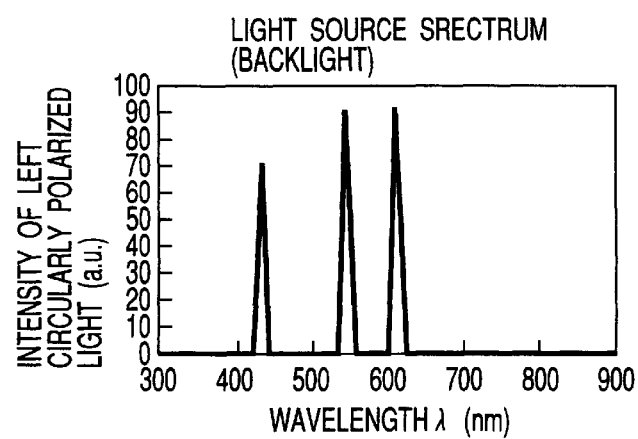

FIGS. 6 and 7 show the intensity profile of left circularly polarized light of external light and the intensity profile of left circularly polarized light of light emitted by the back-surface light source, respectively. When the liquid crystal display device having the selective reflecting layer 18 with the above structure displays an image using these light beams, the characteristics having the reflectance and transmittance as shown in FIG. 8 are obtained. In the region near the three major wavelengths of the back-surface light source 21, the ratio of the reflectance to the transmittance is 5:95. In the remaining region, the ratio is 95:5.

As shown in FIG. 9A, 95% of all the left circularly polarized light emitted by the back-surface light source 21 passes through the selective reflecting layer 18. As shown in FIG. 9B, 90% of all the left circularly polarized light of the external light is reflected by the selective reflecting layer. Irrespective of whether the liquid crystal display device operates as either a reflection type device or the transmission type device, an image can be displayed at a high color purity and high brightness.

Figure 10:
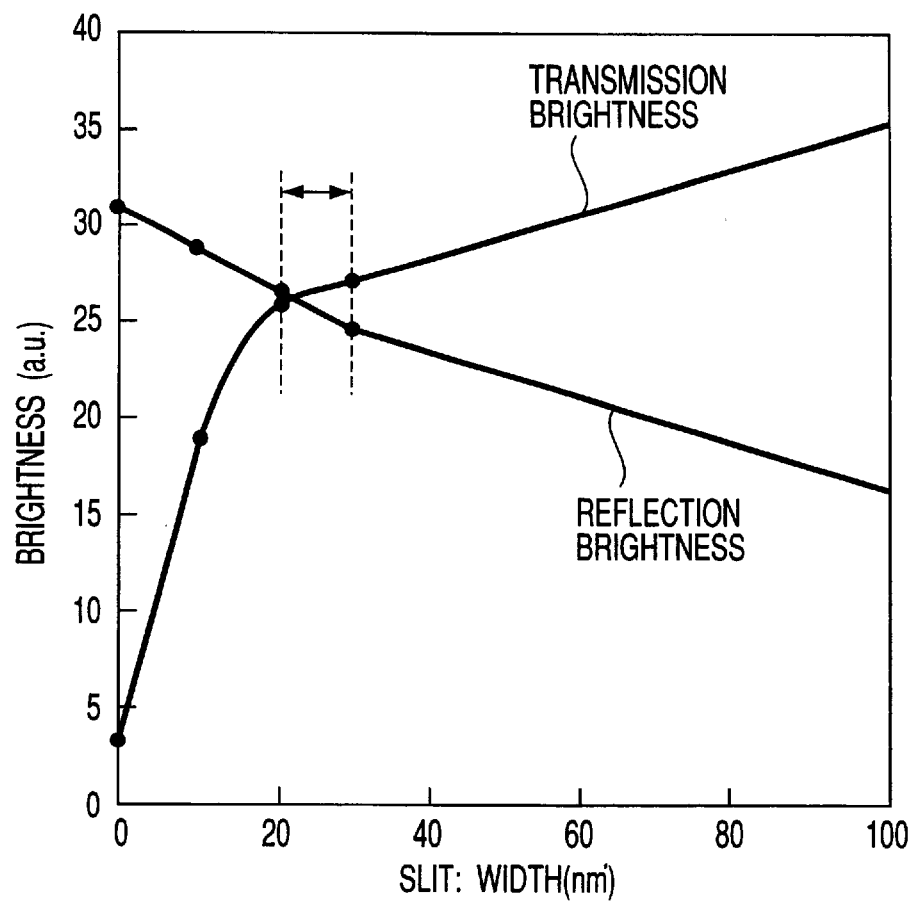

The relationship between the slit width and the brightness of the liquid crystal display device as shown in FIG. 10. When the slit width is set to fall within the range of 20 to 30 nm, the total sum of the transmission brightness and reflection brightness becomes maximum and the brightness of the entire liquid crystal display device becomes maximum.

According to the liquid crystal display device having the above arrangement, even when the display device operates as a reflection type display device using external light or as a transmission type display device using a back-surface light source, a bright image can be displayed with extremely high light utilization efficiency.

The selective reflecting layer 18 made of the cholesteric liquid crystal layer is located in the liquid crystal display element serving as the variable retarder, i.e., between the array substrate 13 and the counter substrate 14. As compared with the structure in which the selective reflecting layer is formed on the outer-surface of the counter substrate 14, the disparity of the substrate 14 can be reduced. For example, when the selective reflecting layer 18 also serves as an insulating layer in forming an active element such as a TFT or MIM on the substrate 14, the manufacturing process can be simplified to reduce the manufacturing cost.

Figure 11A:
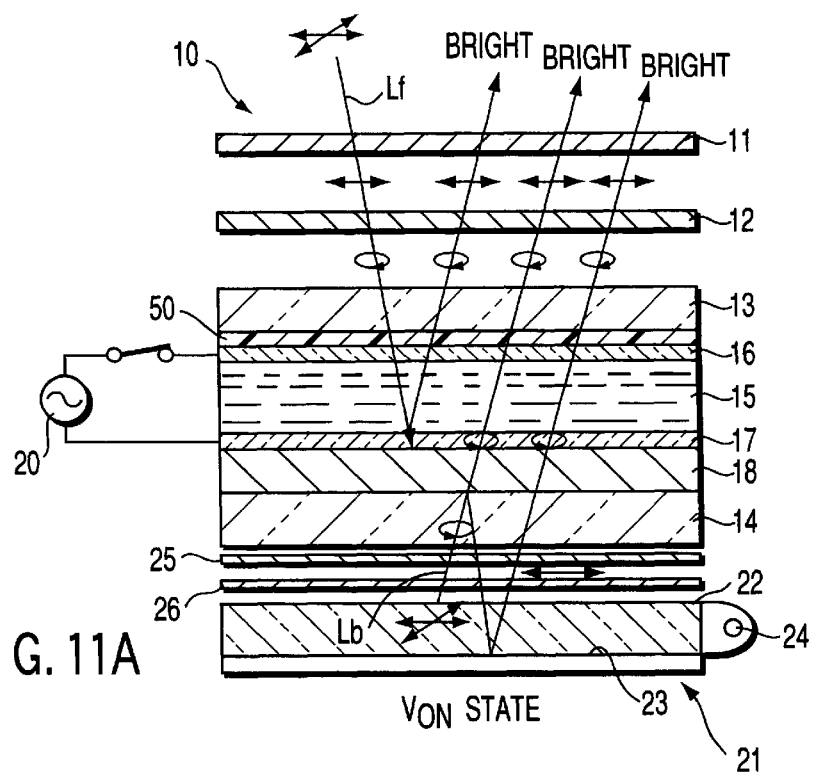
Figure 11B:
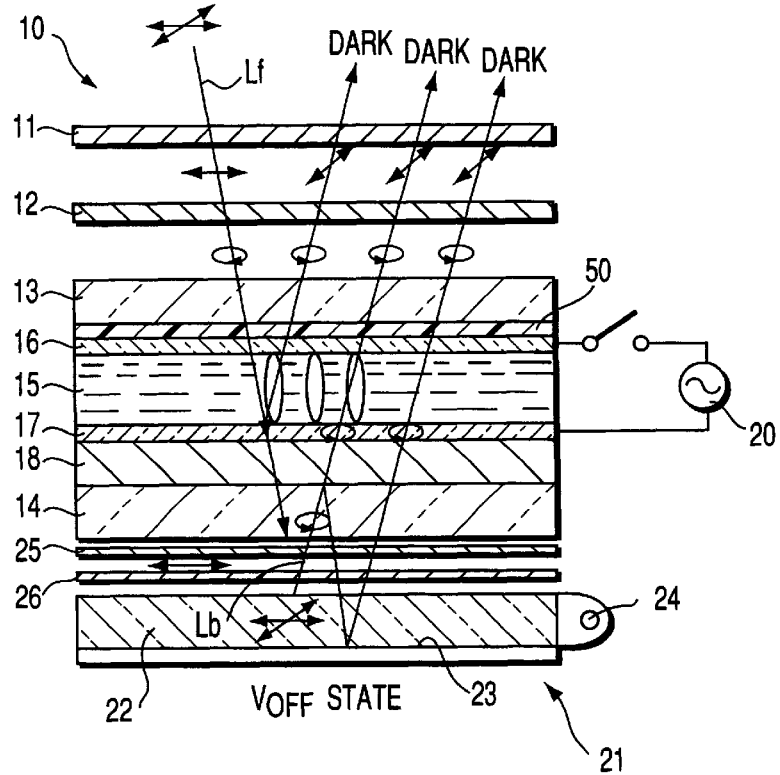
FIG. 11B is a sectional view illustrating a state in which a second voltage is applied to the liquid crystal layer of the liquid crystal display device.

A liquid crystal display device according to the second embodiment of the present invention will now be described. According to the second embodiment, as shown in FIGS. 11A and 11B, a liquid crystal display device 10 has a display element obtained by sandwiching a vertical aligning liquid crystal layer 15 between two opposing glass substrates 13 and 14. A $\lambda/2$ plate 12 and polarization plate 11 are formed in this order on the observation side of this display element, i.e., on the outer surface of the glass substrate 13. A $\lambda/4$ plate 25, polarization plate 26, and back-surface light source 21 are arranged in this order to oppose the outer surface of the other glass substrate 14. The plate 12 serves as a fixed retarder layer, while the liquid crystal layer 15 serves as a variable retarder layer. The fixed and variable retarder layers construct a variable retarder.

The glass substrate. 13 on the observation side of the liquid crystal element constructs an array substrate. A color filter layer 50 to be described later is formed on the inner surface of the glass substrate 13. A large number of pixel electrodes 16 made of transparent ITO form a matrix on the color filer layer to constitute liquid crystal pixels. In addition, signal lines and scanning lines including gate electrodes are formed on the glass substrate 13 in a matrix. TFTs serving as switching elements are formed at the intersections between the signal lines and scanning lines, respectively. The TFTs are connected to the pixel electrodes 16, respectively.

The glass substrate 14 on the back-surface side of the liquid crystal display element constructs a counter substrate. A counter electrode 17 made of a transparent conductive film formed of ITO or the like is formed on almost the entire surface of the glass substrate 14 which opposes the pixel electrodes 16. A selective reflecting layer 18 serving as a semitransparent reflecting layer obtained by polymerizing a cholesteric liquid crystal is formed between the glass substrate 14 and the counter electrode 17.

The remaining structure is the same as that of the first embodiment. The same reference numerals as in the first embodiment denote the same parts, and a detailed description thereof will be omitted.

Assume that the cholesteric liquid crystal forming the selective reflecting layer 18 has a value np (the product of a helical pitch p and an average refractive index n of the liquid crystal molecules) equal to a wavelength $\lambda$ of the incident light. When the liquid crystal molecules have a left-handed helical structure when viewed from the observation side, a left circularly polarized light component of incident light Lf is selectively reflected by the selective reflecting layer 18, and the rest is transmitted through the selective reflecting layer.

When the value np is equal to the wavelength $\lambda$ of the incident light, the cholesteric liquid crystal ideally has a function of reflecting 100% of the circularly polarized light component having the same rotational direction (counterclockwise or clockwise) as that of the helix (counterclockwise or clockwise). When the cholesteric liquid crystal is ford to have an appropriate thickness, the reflectance or transmittance in the corresponding selective reflection wavelength range can be set to an appropriate value. For example, when the reflectance of the selective reflecting layer 18 is set to 70 to 90%, the selective reflecting layer reflects 70 to 90% of the left circularly polarized light component of the incident light and transmits 10 to 30% of this light component.

In the liquid crystal display device 10 having the above selective reflecting layer 18, in the ON state wherein a voltage is applied from a light source 20 to the vertical aligning liquid crystal layer 15, i.e., accurately, in the state (Von state) wherein a voltage equal to or higher than the threshold value of the liquid crystal is applied, as shown in FIG. 11A, the nematic liquid crystal molecules align themselves in a direction parallel to the substrate from the array substrate 13 to the counter substrate 14, i.e., assume a homogeneous alignment.

In this state, light Lf incident downward from the observation side passes through the polarization plate 11 and the λ/4 plate 12 and enters a right circularly polarized light component the liquid crystal layer 15. In this case, the delay phase axis of the λ/4 plate 12 is rotated through 45° with respect to the polarization axis of the polarization plate 11.

The light Lf is delayed in phase λ/2 by the liquid crystal layer 15 and converted into a left circularly polarized light component, which reaches the selective reflecting layer 18. This light component is then reflected by the selective reflecting layer 18, and is delayed in phase λ/2 by the liquid crystal layer 15 again and converted into a right circularly polarized light component, which is output to the observation side. This light component passes through the λ/4 plate 12 again and is converted into a linearly polarized light component along the polarization axis of the polarization plate 11. The linearly polarized light component passes through the polarization plate 11 and is output outside, thereby setting the display in the bright state.

As shown in FIG. 11B, in the Voff state wherein a voltage less than the threshold value is applied to the liquid crystal layer 15, the liquid crystal molecules of the liquid crystal layer 15 align themselves perpendicularly to the surfaces of the glass substrates 13 and 14. The incoming light is not phase-modulated.

In this state, the light Lf incident downward from the observation side passes through the polarization plate 11 and λ/4 plate 12 and enters as a right circularly polarized light component the liquid crystal layer 15 as in the Von state. The light component is not phase-modulated by this liquid crystal layer. The right circularly polarized light component reaches the selective reflecting layer 18 without any polarization. For this reason, the right circularly polarized light component is transmitted through the selective reflecting layer 18 toward the back-surface side and converted by the plate 25 into a linearly polarized light component having a vibration component along the absorption axis of the polarization plate 26. As a result, the incident light Lf does not return to the observation surface to set the display in the dark state.

Operation upon actuating the back-surface light source 21 arranged on the back-surface side of the selective reflecting layer 18 will be described below. In the Von state in FIG. 11A, light Lb output from the surface light source 21 is converted into a left circularly polarized light component by the polarization plate 26 and λ/4 plate 25. A predetermined portion (about 10 to 30%) of the left circularly polarized light component passes through the selective reflecting layer 18, and the rest is reflected by the selective reflecting layer. The light component having passed through the selective reflecting layer 18 is phase-modulated by the liquid crystal layer 15 and converted into a right circularly polarized light component. This light component passes through the λ/4 plate 12 to obtain a linearly polarized light component along the polarization axis of the polarization plate 11. This light component passes through the polarization plate 11 and output to the observation-surface side, thereby setting the display in the bright state.

In the Voff state shown in FIG. 11B, the left circularly polarized light component passing through the selective reflecting layer 18 is not phase-modulated by the liquid crystal layer 15 and is directly output to the observation side. This light component passes through the λ/4 plate 12 and is converted into a linearly polarized light component having a vibration direction perpendicular to the polarization axis of the polarization plate 11. The polarization plate 11 absorbs this light component, thereby setting the display in the dark state.

According to the second embodiment, in the liquid crystal display device that operates as described above, a color filter (CF) layer 50 is formed on the inner surface of the glass substrate 13 on the observation side, while the selective reflection (Ch) layer 18 is formed on the inner surface of the glass substrate 14 on the back-surface side. The color filter layer 50 and the selective reflecting layer 18 have a pattern corresponding to the array pattern of the pixel electrodes forming the liquid crystal pixels.

Figure 12:
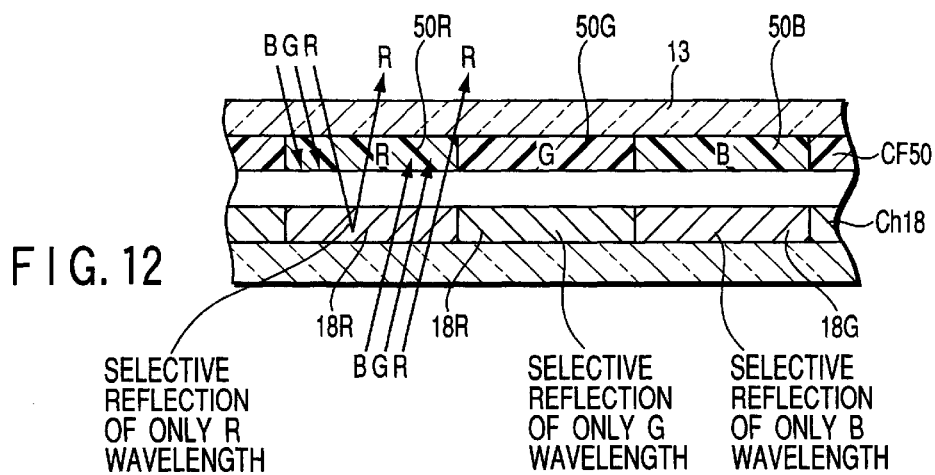

As schematically illustrated in FIG. 12, the color filter layer 50 has three color filters 50R, 50G, and 50B, i.e., R, G, and B filters. These color filters are formed in stripes along the liquid crystal pixel array in units of three colors. The selective reflecting layer 18 has three types of selective reflecting filters 18R, 18G, and 18B. These selective reflecting filters are formed in stripes along the liquid crystal pixel array in a predetermined cycle. The selective reflecting filters 18R, 18G, and 18B are formed to selectively and partially reflect light components having different wavelength bands and are arranged to oppose the corresponding color filters 50R, 50G, and 50B.

Figure 13:
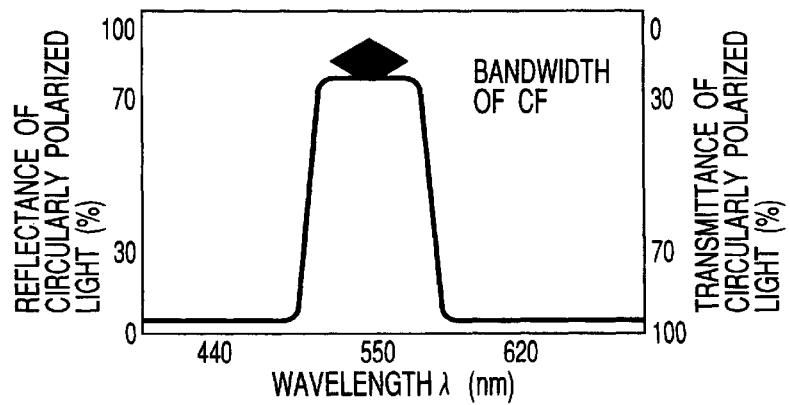

As shown in FIG. 13, for example, the selective reflecting filter 18G facing the G liquid crystal pixel and color filter 50G transmits about 70% of light having a predetermined band centered on the wavelength of 550 nm and transmits about 30% of this light. At the same time, the selective reflecting filter 18G transmits almost all the light in other wavelength bands. Similarly, the selective reflecting filter 18R facing the R liquid crystal pixel and color filter 50R transmits about 70% of light having a predetermined band centered on the wavelength of 550 nm and transmits about 30% of this light. At the same time, the selective reflecting filter 18R transmits almost all the light in other wavelength bands. The selective reflecting filter 18B facing the B liquid crystal pixel and color filter 50B transmits about 70% of light having a predetermined band centered on the wavelength of 700 nm and transmits about 30% of this light. At the same time, the selective reflecting filter 18B transmits almost all the light in other wavelength bands.

Figure 14:
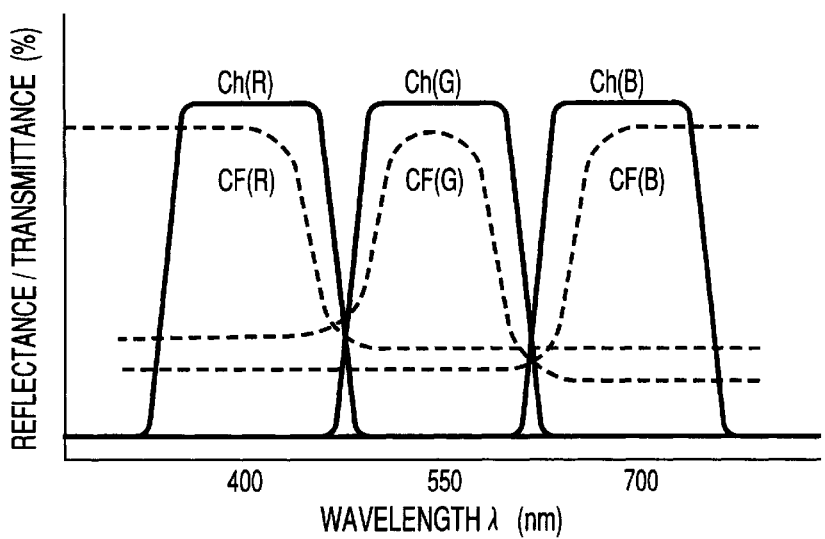

As shown in FIG. 14, the selective reflecting filters 18R, 18G, and 18B corresponding to R, G, and B exhibit selective reflectances in predetermined bands having center frequencies of 400 nm, 550 nm, and 700 nm, respectively. The reflection characteristic curves of these filters partially overlap at their tails. The spectral characteristics of the color filters 50R, 50G, and 50B are set such that the peak wavelengths fall within the corresponding selective reflection wavelength bands.

The glass substrate 14 including the cholesteric liquid crystal layer 18 having the plurality of selective reflecting filters 18R, 18G, and 18B with different selective reflection characteristics is formed as follows. More specifically, a polyimide film is formed on one entire major surface of a glass substrate 14, spacers having an appropriate particle size are sprinkled, and the resultant surface is coated with a cholesteric liquid crystal material. This substrate is heated until the cholesteric liquid crystal becomes isotropic (ISO).

A flat substrate such as a cuff coated with a polyimide film is placed facing the glass substrate 14. The cholesteric liquid crystal material is irradiated with an ultraviolet ray through a reticule having a predetermined pattern while heating the glass substrate 14. The cholesteric liquid crystal material in the area irradiated with the ultraviolet ray is cured by optical crosslinking as a liquid crystal polymer having a predetermined helical pitch. The uncured area of the cholesteric liquid crystal material is irradiated with an ultraviolet ray while changing the exposure amount. This operation is repeated to form a plurality of regions 18R, 18G, and 18B having different helical pitches in the cholesteric liquid crystal layer.

The helical pitch of each of the selective reflecting filters 18R, 18G, and 18B has a predetermined change width corresponding to the selective reflection wavelength band. The average values of the change widths are made different in the selective reflecting filters 18R, 18G, and 18B.

When the cholesteric liquid crystal layer in all the regions is completely cured, the mating glass substrate is separated from the glass substrate 14. An overcoat layer made of acrylic resin or the like is formed on the cholesteric liquid crystal layer, and a transparent electrode is formed on the entire surface. An aligning film is formed on the transparent electrode to prepare the glass substrate 14 on the back-surface side.

In the glass substrate 13 on the observation-surface side, active elements such as TFTs, liquid crystal drive electrodes, and aligning film are sequentially formed on an RGB color filter layer 50 formed by a known pigment dispersion method. These glass substrates 13 and 14 are set face to face so that the pattern of the selective reflecting layer 18 aligns with the pattern of the color filter layer 50. The glass substrates 13 and 14 are then sealed to obtain liquid crystal display elements.

According to the liquid crystal display device having the above arrangement, the selective reflecting filters of the selective reflecting layer 18 are combined with the corresponding color filters of the color filter layer to construct the R, G, and B color pixels. The reflection wavelength band of each selective reflecting filter is set to the band including the peak wavelength of the spectral characteristics of the corresponding color filter. As a result, as shown in FIG. 12, external light incident from the observation-surface side of the liquid crystal display device passes through the color filter layer 50 and enters the selective reflecting layer 18. For example, of the external light incident on the selective reflecting filter 18R corresponding to the color filter 50R, only the light component in the R wavelength range is reflected by the selective reflecting filter 18R. The reflected light component passes through the color filter 50R again and is output to the observation side. The remaining light components pass through the selective reflecting filter.

Of light output from the back-surface light source and incident on the selective reflecting filter 18R, about 70% of the light component in the R wavelength region is reflected by the selective reflecting filter 18R, while 30% of this light component is transmitted through the selective reflecting filter 18R. The transmitted light component is transmitted through the color filter 50R and then output. Of the light incident on the selective reflecting filter 18R, the light components in the wavelength region except the R wavelength region are transmitted through the selective reflecting filter 18R and then the color filter 50R, and is output. The light beams in the G and B wavelength regions undergo the reflection and transmission processes as described above by the selective reflecting filters 18G and 18R of the selective reflecting layer 18.

As described above, in the liquid crystal display device of the second embodiment having the above arrangement as well, an image can be displayed with a high color purity and high brightness in either reflection display using external light or transmission display using the back-surface light source. Since the selective reflecting layer is obtained by arraying the cholesteric liquid crystal patterns so as to exhibit necessary selective reflection characteristics corresponding to the color pixels, the selective reflecting layer need not be formed to exhibit selective reflection characteristics in the entire visible light range, thereby reducing the manufacturing cost.

In the second embodiment, as a method of forming a plurality of regions having different selective reflection characteristics in the selective reflecting layer, a method of changing the substrate heating temperature of an arbitrary region in exposure without changing the ultraviolet exposure amount is available in addition to the method of changing the ultraviolet exposure amounts in units of regions.

In the second embodiment, the pixel electrodes, TFTs, and the like are formed on the observation-side glass substrate, and the counter electrode is formed on the back-surface-side glass substrate. However, the counter electrode may be formed on the observation-side glass substrate, and the pixel electrodes, TFTs, and the like may be formed on the back-surface-side glass substrate.

According to the third embodiment shown in FIG. 15, an optical system 60 is additionally used to increase the light utilization efficiency of a back-surface light source in a liquid crystal display device. This optical system 60 has a phase difference plate 51 and second cholesteric liquid crystal layer 52 formed between a back-surface light source 21 and polarization plate 26. The remaining structure of the third embodiment is the same as that of the second embodiment, and a detailed description thereof will be omitted.

This optical system 60 converts part of light from the back-surface light source into a linearly polarized light component along the polarization axis before the polarization plate 26 and reflects the rest toward the back-surface light source 21 side, thereby recycling the light. The second cholesteric liquid crystal layer 52 has a left-handed helical structure as in the selective reflecting layer 18. The phase difference plate 51 has a slow axis parallel to that of a phase difference plate 25.

According to the liquid crystal display device having the above arrangement, of light emitted by the back-surface light source 21, a right circularly polarized light component is transmitted through the second cholesteric liquid crystal layer 52, while most of a left circularly polarized light component is reflected by the second cholesteric liquid crystal layer. However, the second cholesteric liquid crystal layer transmits about 10 to 30% of the light from the light source. When the transmitted circularly polarized light component is incident on the phase difference plate 51, the right circularly polarized light component is converted into a linear polarized light component having a vibration component parallel to the polarization axis of the polarization plate 26. The selective reflecting layer 18 receives only the left circularly polarized light component passing through the polarization plate 26 and converted by the phase difference plate 25.

The selective reflecting layer 18 reflects about 70 to 90% of this left circularly polarized light component. The reflected light component is converted by the phase difference plate 51 into a linearly polarized light component, which then passes through the polarization plate 26. This linearly polarized light component is then converted by the phase difference plate 51 into a circularly polarized light component, which then passes through the second cholesteric liquid crystal layer 52. This circularly polarized light component reaches a reflecting plate 23 of the back-surface light source 21 and is split into the respective polarized components. This operation is repeated to recycle the light reflected toward the back-surface light source 21, thereby improving the light utilization efficiency of the light source.

The optical system 60 is not limited to the above structure. When a cholesteric liquid crystal layer having the opposite twist direction is used, an optical system having the same function as that of the optical system 60 can be obtained by rotating the slow axis direction of the phase difference plate 51 through 180°.

A liquid crystal display device according to the fourth embodiment of the present invention will be described below. A liquid crystal display device 10 according to the fourth embodiment has substantially the same arrangement as that of the second embodiment. As shown in FIG. 16, the liquid crystal display device 10 has a display element obtained by sandwiching a vertical aligning liquid crystal layer 15 between two opposing glass substrates 13 and 14. A λ/2 plate 12 and polarization plate 11 are formed in this order on the observation side of this display element, i.e., on the outer surface of the glass substrate 13. A λ/4 plate 25, polarization plate 26, and back-surface light source 21 are arranged in this order to oppose the outer surface of the other glass substrate 14. The plate 12 serves as a fixed retarder layer, while the liquid crystal layer 15 serves as a variable retarder layer. The fixed and variable retarder layers construct a variable retarder.

The glass substrate 13 on the observation side of the liquid crystal element constructs an array substrate. A color filter layer 50 to be described later is formed on the inner surface of the glass substrate 13. A large number of pixel electrodes 16 made of transparent ITO form a matrix on the color filer layer to constitute liquid crystal pixels. In addition, signal lines and scanning lines including gate electrodes are formed on the glass substrate 13 in a matrix. TFTs serving as switching elements are formed at the intersections between the signal lines and scanning lines, respectively. The TFTs are connected to the pixel electrodes 16, respectively.

The glass substrate 14 on the back-surface side of the liquid crystal display element constructs a counter substrate. A counter electrode 17 made of a transparent conductive film formed of ITO or the like is formed on almost the entire surface of the glass substrate 14 which opposes the pixel electrodes 16. A selective reflecting layer 18 serving as a semitransparent reflecting layer obtained by polymerizing a cholesteric liquid crystal is formed between the glass substrate 14 and the counter electrode 17.

Assume that the cholesteric liquid crystal forming the selective reflecting layer 18 has a value np (the product of a helical pitch p and an average refractive index n of the liquid crystal molecules) equal to a wavelength λ of the incident light. When the liquid crystal molecules have a left-handed helical structure when viewed from the observation side, a left circularly polarized light component of incident light Lf is selectively reflected by the selective reflecting layer 18, and the rest is transmitted through the selective reflecting layer.

When the value np is equal to the wavelength λ of the incident light, the cholesteric liquid crystal ideally has a function of reflecting 100% of the circularly polarized light component having the same rotational direction (counterclockwise or clockwise) as that of the helix (counterclockwise or clockwise). When the cholesteric liquid crystal is ford to have an appropriate thickness, the reflectance or transmittance in the corresponding selective reflection wavelength range can be set to an appropriate value.

The remaining arrangement of the fourth embodiment is substantially the same as that of the first embodiment. The same reference numerals as in the first embodiment denote the same parts in the fourth embodiment, and a detailed description thereof will be omitted. The basic operation of the liquid crystal display device having the above arrangement of the fourth embodiment is substantially the same as that of the second embodiment, and a detailed description thereof will be omitted.

The fourth embodiment is different from the second embodiment in the structure of the selective reflecting layer 18 used in combination with a color filter layer 50. More specifically, in the liquid crystal display device according to the fourth embodiment, the color filter (CF) layer 50 is formed on the inner surface of the glass substrate 13 on the observation side, while the selective reflection (Ch) layer 18 is formed on the inner surface of the glass substrate 14 on the back-surface side. The color filter layer 50 and the selective reflecting layer 18 have a pattern corresponding to the array pattern of the pixel electrodes forming the liquid crystal pixels.

Figure 17:
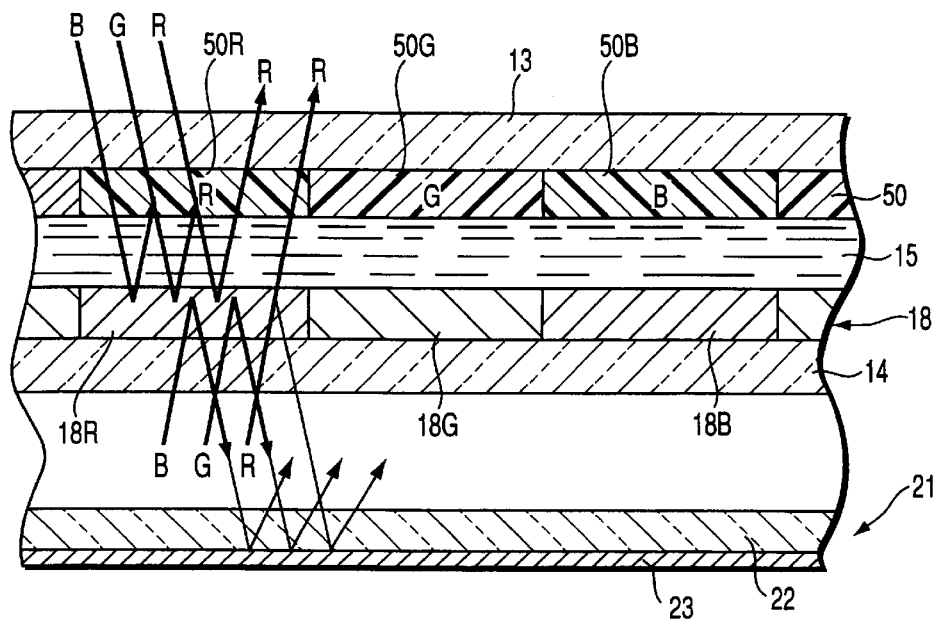

As schematically illustrated in FIG. 17, the color filter layer 50 has three color filters 50R, 50G, and 50B, i.e., R, G, and B filters. These color filters are formed in stripes along the liquid crystal pixel array in units of three colors. The selective reflecting layer 18 has three types of selective reflecting filters 18R, 18G, and 18B. These selective reflecting filters are formed in stripes along the liquid crystal pixel array in a predetermined cycle. The selective reflecting filters 18R, 18G, and 18B are formed to selectively and partially reflect light components having different wavelength bands and are arranged to oppose the corresponding color filters 50R, 50G, and 50B.

Figure 18:
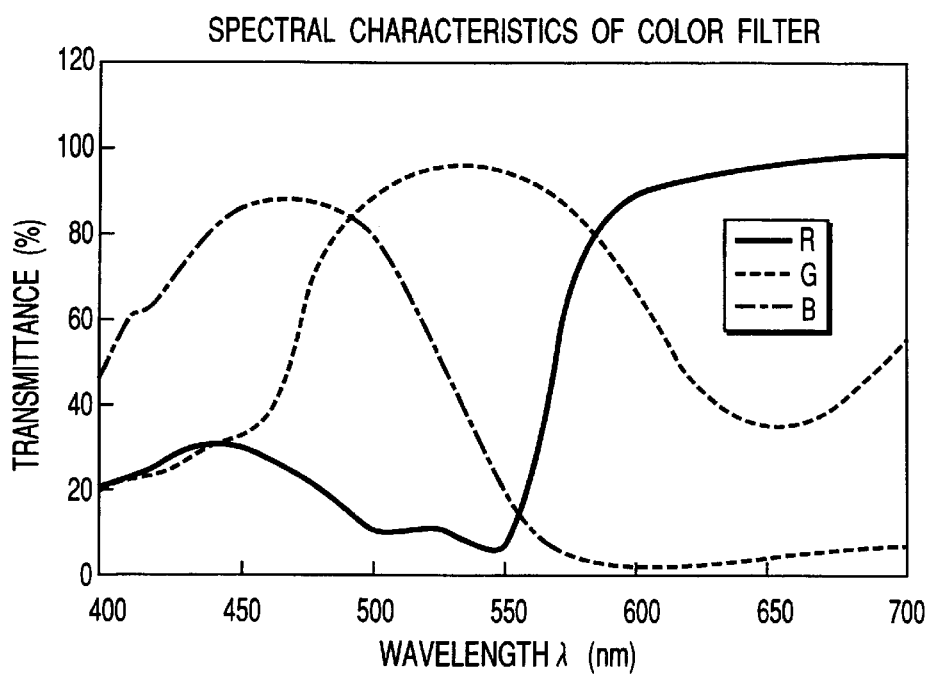

The color filer layer 50 has the spectral characteristics shown in FIG. 18. Each G (green) color filter 50G has a transmittance of 50% or more in the wavelength range near 550 nm and a transmittance of less than 50% in other wavelength ranges. Each B (blue) color filter 50B has a transmittance of 50% or more in the wavelength range near 430 nm and a transmittance of less than 50% in other wavelength ranges. Each R (red) color filter 50R has a transmittance of 50% or more in the wavelength range near 610 nm and a transmittance of less than 50% in other wavelength ranges.

Figure 19:
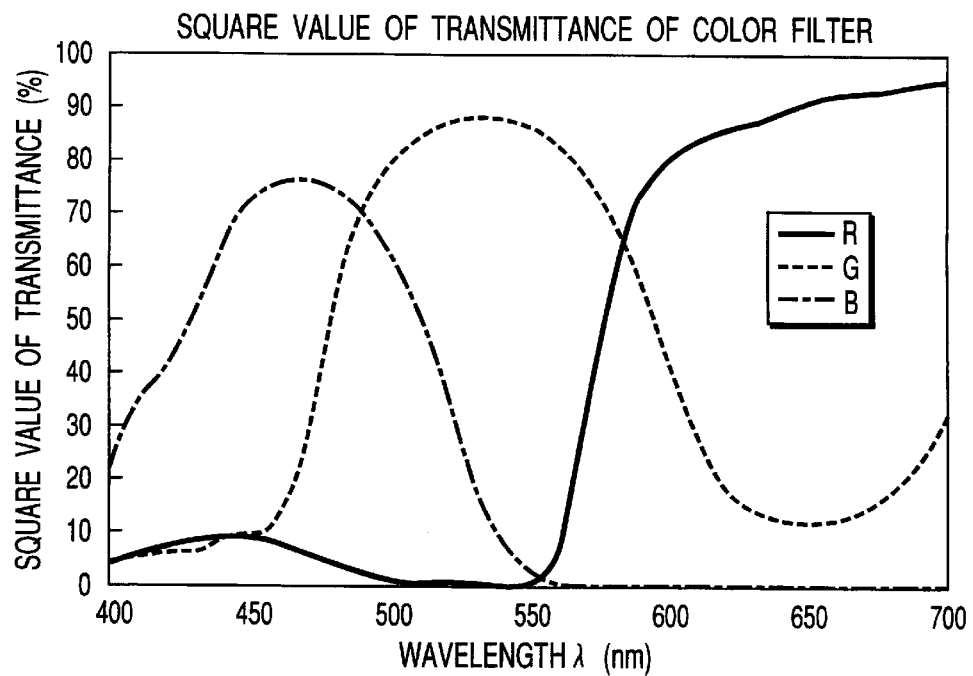

As shown in FIG. 19, the square value of the Y value (Y in tristimulus values) of the average transmittance of the color filter layer 50 is set to 40% or more.

Figure 20:
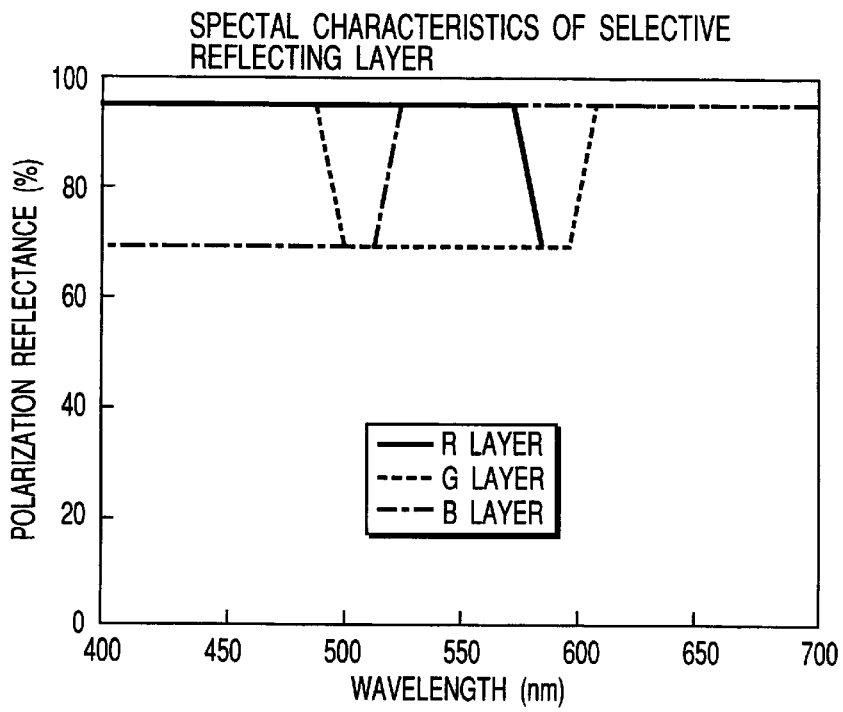

Of the selective reflecting layer 18, a selective reflecting filter 18R disposed to oppose the color filter 50R has a reflectance of 50% to 90%, e.g., 70% and a transmittance of 30% for polarized light in the wavelength range in which the transmittance of the color filter 50R is 50% or more, as shown in FIG. 20. The selective reflecting filter 18R has a high reflectance of more than 90% for polarized light in the wavelength range in which the transmittance of the color filter 50R is less than 50%.

A selective reflecting filter 18G disposed to oppose the color filter 50G has a reflectance of 50% to 90%, e.g., 70% and a transmittance of 30% for polarized light in the wavelength range in which the transmittance of the color filter 50G is 50% or more. The selective reflecting filter 18G has a high reflectance of more than 90% for polarized light in the wavelength range in which the transmittance of the color filter 50G is less than 50%.

Similarly, a selective reflecting filter 18B disposed to oppose the color filter 50B has a reflectance of 50% to 90%, e.g., 70% and a transmittance of 30% for polarized light in the wavelength range in which the transmittance of the color filter 50B is 50% or more. The selective reflecting filter 18B has a high reflectance of more than 90% for polarized light in the wavelength range in which the transmittance of the color filter 50B is less than 50%.

The selective reflection wavelength range of each of the selective reflecting filters 18R, 18G, and 18B partially overlaps the selective reflection wavelength range of any adjacent selective reflecting filter.

The glass substrate 14 having the selective reflecting layer 18 with the selective reflecting filters 18R, 18G, and 18B having different selective reflection characteristics is formed as follows.

(1) As shown in FIG. 21A, a pqlyimide film is formed on the entire major surface of the glass substrate 14, and a cholesteric liquid crystal material having a helical pitch p (selective reflection wavelength λ/average refractive index n) of 620/1.54 is applied onto the polyimide film to a thickness of 2.0 μm. The entire surface of the cholesteric liquid crystal display material is irradiated with ultraviolet rays for 5 min to cure the liquid crystal polymer, thereby forming a cholesteric liquid crystal layer P1 as the first layer.

(2) Subsequently, a cholesteric liquid crystal material as in (1) is applied to the cholesteric liquid crystal layer P1 as the first layer to a thickness of 1.0 μm. The regions corresponding to the selective reflecting filters G and B are shielded with a mask 70 and irradiated with ultraviolet rays for 5 min to expose the region corresponding to the selective reflecting filter R.

(3) The cholesteric liquid crystal material as the second layer is heated to about 100° C. and liquefied, and the entire surface is irradiated with ultraviolet rays for 5 min to perform exposure, thereby forming a cholesteric liquid crystal layer P2 as the second layer. In this case, a region 72 corresponding to the selective reflecting filter R in the cholesteric liquid crystal layer as the second layer becomes transparent. The region corresponding to the selective reflecting filter R in the cholesteric liquid crystal layers as the first and second layers has a reflectance of 70% for light in the R wavelength range, while the regions corresponding to the selective reflecting filters G and B have a reflectance of 100% for light in the R wavelength range.

(4) As shown in FIG. 21B, third and fourth cholesteric liquid crystal layers P3 and P4 are formed following the same procedures as in (1) to (3) using a cholesteric liquid crystal material having p=550/1.54. Note that in forming the cholesteric liquid crystal layer P4 as the fourth layer, the regions corresponding to the selective reflecting filters R and B are shielded with a mask 73, and exposure is performed. A region 74 corresponding to the selective reflecting filter G in the cholesteric liquid crystal layer P4 as the fourth layer becomes transparent. Of the cholesteric liquid crystal layers as the third and fourth layers, the region corresponding to the selective reflecting filter G has a reflectance of 70% for light in the G wavelength range, and the regions corresponding to the selective reflecting filters R and B have a reflectance of 100% for light in the G wavelength range.

(5) As shown in FIG. 21C, cholesteric liquid crystal layers P5 and P6 are formed following the same procedures as in (1) to (3) using a cholesteric liquid crystal material having p=440/1.54. Note that in forming the cholesteric liquid crystal layer P6 as the sixth layer, the regions corresponding to the selective reflecting filters R and G are shielded with a mask, and exposure is performed. A region 76 corresponding to the selective reflecting filter B in the cholesteric liquid crystal layer P6 as the sixth layer becomes transparent. The region corresponding to the selective reflecting filter B in the cholesteric liquid crystal layers as the fifth and sixth layers has a reflectance of 70% for light in the B wavelength range, and the regions corresponding to the selective reflecting filters R and G has a reflectance of 100% for light in the B wavelength range.

By the above process, the selective reflecting layer 18 having the plurality of selective reflecting regions 18R, 18G, and 18B having different helical pitches is formed. When the cholesteric liquid crystal layers in all the regions are cured, an overcoat layer made of, e.g., acrylic resin is formed on the cholesteric liquid crystal layers, and a transparent electrode is formed on the entire surface. An aligning film is then formed on the transparent electrode to obtain the back-surface-side glass substrate 14.

Active elements such as TFTs, liquid crystal drive electrodes, an aligning film, and the like are sequentially formed on the RGB color filter layer formed by a known pigment dispersion method to obtain the observation-surface-side glass substrate 13. The glass substrates 13 and 14 are disposed to oppose such that the pattern of the selective reflecting layer 18 is aligned with the pattern of the color filter layer 50. The glass substrates 13 and 14 are then sealed to obtain liquid crystal display elements.

According to the liquid crystal display device having the above arrangement according to the fourth embodiment, the selective reflecting filters of the selective reflecting layer 18 are combined with the corresponding color filters of the color filter layer to form R, G, and B pixels. Each selective reflecting filter has a reflectance of 70% for light in the wavelength range in which the transmittance of the corresponding opposing color filter in the visible light range is 50% or more. For this reason, when the liquid crystal display device functions as the reflection type, the polarized light component in the R wavelength range of the light entering through the color filter 50R is reflected in 70% by the selective reflecting filter 18R and is transmitted and output through the color filter 50R, as shown in FIG. 17. Sufficiently high brightness can be obtained in display.

When the liquid crystal display device functions as the transmission type, for example, of all the light entering from the back-surface light source 21 to the selective reflecting filter 18R, 30% of the polarized light component in the R wavelength range passes through the selective reflecting filter 18R. A polarized light component corresponding to 70% of the reflectance is reflected by the reflecting plate 23 of the back-surface light source 21 and reused to contribute to the display brightness. That is, the sum of the above two light amounts allows the polarization transmittance of the selective reflecting filter 18R to become about 70% in the R wavelength range. Therefore, an image can be displayed with sufficiently high reflection brightness.

Figure 22:
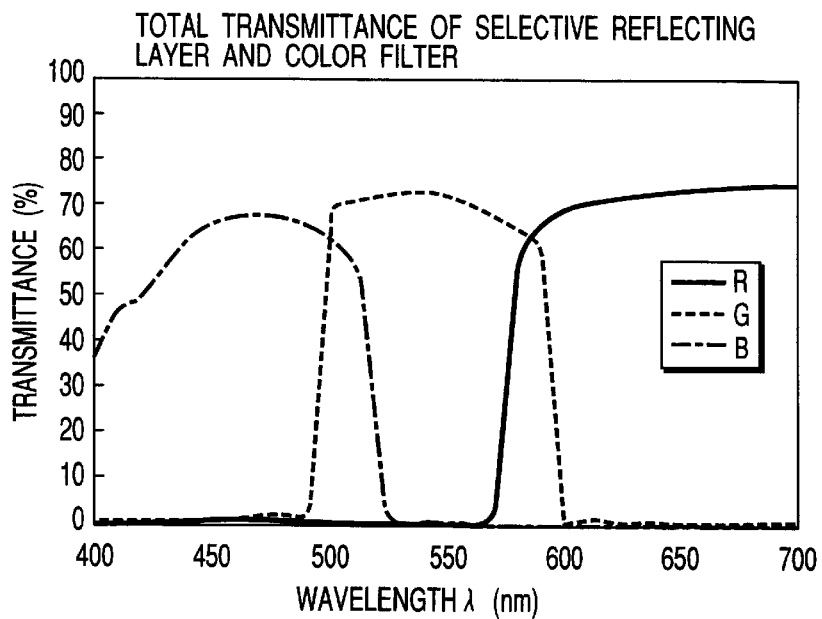

Each of the selective reflecting filters 18R, 18G, and 18B has a reflectance of almost 100% for light in the wavelength range in which the transmittance of the color filter opposing each selective reflecting filter is less than 50%. When the liquid crystal display device functions as the reflection type, external light passes through the color filter layer 50 twice. As shown in FIG. 19, an image is displayed with a sufficiently high saturation. When the liquid crystal display device functions as the transmission type, light in the wavelength range in which the corresponding color filter has a reflectance of less than 50% is reflected by the corresponding one of the selective reflecting filters 18R, 18G, and 18B toward the back-surface light source 21. This light is output without passing through the corresponding liquid crystal pixel. Therefore, a sufficiently high saturation can be obtained in display, as shown in FIG. 22.

Even in the liquid crystal display device having the above arrangement according to the fourth embodiment, an image can be displayed with a high color purity and high brightness in both the reflection display using external light and the transmission display using the back-surface light source. The selective reflecting layer is obtained by arraying cholesteric liquid crystal patterns having selective reflection characteristics necessary in correspondence with the respective color pixels. The selective reflecting layer need not be formed to have selective reflection characteristics in all the visible light range, thereby reducing the manufacturing cost.

Figure 23:
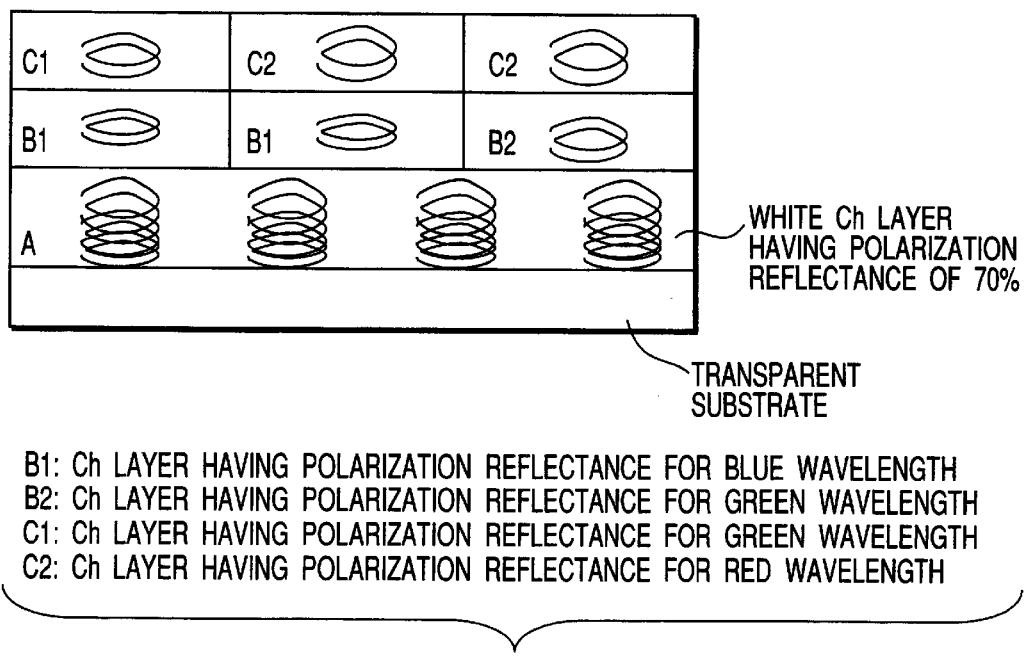
FIG. 23 is a view illustrating the modification of the selective reflecting layer in the fourth embodiment.

In the fourth embodiment described, the selective reflecting layer 18 may be formed, as shown in FIG. 23. That is, this selective reflecting layer 18 is formed on the entire surface of the glass substrate 14 and has a cholesteric liquid crystal layer A having a polarization reflectance of 70%. In the region corresponding to each selective reflecting filter 18R, a cholesteric liquid crystal layer B1 having a reflectance of 30% for light in the blue (B) wavelength range and a cholesteric liquid crystal layer C1 having a reflectance of 30% for light in the green (G) wavelength range are stacked on the cholesteric liquid crystal layer in this order.

In the region corresponding to each selective reflecting filter 18G, a cholesteric liquid crystal layer B1 having a reflectance of 30% for light in the blue (B) wavelength range and a cholesteric liquid crystal layer C2 having a reflectance of 30% for light in the red (R) wavelength range are stacked on the cholesteric liquid crystal layer in this order.

In the region corresponding to each selective reflecting filter 18B, a cholesteric liquid crystal layer B2 having a reflectance of 30% for light in the green (G) wavelength range and a cholesteric liquid crystal layer C2 are stacked on the cholesteric liquid crystal layer in this order.

The same function and effect as in the above embodiment can obtained by using the selective reflecting layer having the above structure.

For example, in each embodiment described above, a liquid display element is used as a variable retarder. However, the same effect as described above can be obtained if an element can control by an electric field whether the phase of incident light is shifted by $\lambda/2$, i.e., phase modulation is performed. For example, a so-called ECB (Electrically Controlled Birefringence mode) liquid crystal in a broad sense can be used.

A liquid crystal display element may be a horizontally aligned nematic liquid crystal display element in which nematic liquid crystal molecules lie parallel to the surface of a glass substrate, or a twisted nematic liquid crystal display element in which nematic liquid crystal molecules are twisted. When a phase difference plate is arranged such that the slow axis is rotated about 45° counterclockwise from the polarization axis, the same effect as described above can be obtained, provided that the twist direction of the cholesteric liquid crystal is set clockwise.

In each liquid crystal display device described above, an intermediate voltage between Von and Voff may be applied as a voltage applied to the variable retarder layer to allow halftone display. In medium to large liquid crystal display devices each having a diagonal screen size of 8" or more, an optical diffusion film may be formed on the outer surface of the array substrate 13 to increase the viewing angle.

A liquid crystal display device as a combination of the first and second embodiments, a liquid crystal display device as a combination of the second and fourth embodiments, a liquid crystal display device as a combination of the first and fourth embodiments, or a liquid crystal display device as a combination of the third and fourth embodiments can be arranged.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flat display device comprising:
   a first polarization plate having a polarization axis and adapted to transmit linearly polarized light along the polarization axis;
   an optical modulation layer locked behind the first polarization plate to modulate incident light in accordance with an applied voltage:
   a backlight located behind the optical modulation layer to output light having intensity peaks in wavelengths of 430 nm, 550 nm and 610 nm;
   a selective reflecting layer located between The optical modulation layer and the backlight and configured to transmit, of a first circularly polarized light component of the incident light, substantially all of light components having wavelengths in first, second and third small regions including wavelengths of 430 nm, 550 nm and 610 nm, respectively, and reflect substantially all of a light component in regions between the first, second and third small regions;
   a circular polarizer plate including a $\lambda/4$ plate and a second polarization plate and located between the selective reflecting layer and the backlight, the circular polarizer plate being configured to transmit the first circularly polarized light component of incident light and to reflect light component of the incident light, which is circularly polarized in a direction opposite to the first circularly polarized light component.

2. An apparatus according to claim 1, wherein the selective reflecting layer is formed of a polymerized cholesteric liquid crystal layer, the cholesteric liquid coal layer has a helical structure wherein of the first circularly polarized light component, light components in the plurality of small regions including the respective predetermined wavelengths are substantially entirely transmitted, and light components in regions between the plurality of small regions are substantially entirely reflected.

3. An apparatus according to claim 1, wherein each of the plurality of small regions has a width of 20 to 30 nm.

4. A liquid crystal display device comprising:

a first polarization plate having a polarization axis and adapted to transmit linearly polarized light along the polarization axis;

an optical modulation layer which is sandwiched between a pair of observation-side and back-surface-side transparent substrates opposing each other and has a plurality of liquid crystal pixels arranged in a matrix, for modulating incident light in accordance with an applied voltage, the optical modulation layer being located behind the first polarization plate;

a selective reflecting layer located behind the optical modulation layer and having a plurality of first, second and third selective reflecting filters arrayed in a predetermined cycle, respectively, on back-surface sides of the liquid crystal pixels to selectively and partially reflect first circularly polarized light components of the incident light having different wavelength bands including wavelengths of 430 nm, 550 nm and 610 nm, respectively;

a color filter layer having a plurality of color filters disposed to oppose front-surface sides of the selective reflecting fitters and arranged such that a peak wavelength of special characteristics in a visible light range of each of the color filters falls within a reflection wavelength band of a corresponding one of the first, second and third selective reflecting filters;

a circular polarizer plate including a $\lambda/4$ plate and a second polarization plate located behind the selective reflecting layer, the circular polarizer plate being configured to transmit the first circularly polarized light components of incident light and to reflect light components of the incident light which are circularly polarized in a direction opposite to the first circularly polarized light components; and a backlight located behind the second polarization plate to output light.

5. An apparatus according to claim 4, wherein the color filter layer is formed on an inner surface of the observation-side transparent substrate.

6. An apparatus according to claim 4, wherein the selective reflecting layer is arranged between the optical modulation layer and the back-surface-side transparent substrate.

7. An apparatus according to claim 4, wherein the plurality of selective reflecting filters are made of cholesteric liquid crystal layers, respectively.

8. An apparatus according to claim 7, wherein an average value of helical pitches of the cholesteric liquid crystal layers changes between adjacent ones of the selective reflecting filter.

9. An apparatus according to claim 4, wherein each of the selective reflecting filters and color filters has a shape of a stripe extending along an array of the liquid crystal pixels.

10. An apparatus according to claim 4, wherein each of the selective reflecting filters has a reflection wavelength band partially overlapping that of either adjacent one of the selective reflecting filters.

11. An apparatus according to claim 4, further comprising a surface light source arranged on a back-surface side of the selective reflecting layer.

* * * * *